United States Patent [19]

Sakamoto

[11] Patent Number: 5,204,780
[45] Date of Patent: Apr. 20, 1993

[54] LENS SYSTEM FOR A COPYING MACHINE
[75] Inventor: Keijiro Sakamoto, Kaloleni, Kenya
[73] Assignee: Minolta Camera Kabushiki Kaisha, Osaka, Japan
[21] Appl. No.: 794,355
[22] Filed: Nov. 12, 1991

Related U.S. Application Data

[63] Continuation of Ser. No. 499,096, Mar. 26, 1990, abandoned.

[30] Foreign Application Priority Data

Mar. 28, 1989 [JP] Japan .................. 1-077304
Mar. 29, 1989 [JP] Japan .................. 1-080119

[51] Int. Cl.⁵ .............................. G02B 15/14
[52] U.S. Cl. .................... 359/690; 359/689; 359/784; 359/785
[58] Field of Search ........ 350/474, 475, 432; 359/690, 689, 708, 784, 785

[56] References Cited

U.S. PATENT DOCUMENTS 4,561,730  12/1985  Lawson .
4,620,775  11/1986  Fujioka .
4,787,724  11/1988  Kudo et al. .............. 350/475
4,886,342  12/1989  Kudo et al. .............. 350/475
4,892,398   1/1990  Kudo et al. .............. 350/475

FOREIGN PATENT DOCUMENTS 59-45418  12/1984  Japan .

Primary Examiner—Bruce Y. Arnold
Assistant Examiner—Hung Xuan Dang
Attorney, Agent, or Firm—Price, Gess & Ubell

[57] ABSTRACT

A three group, three component lens system comprising, in order from one side a first, positive meniscus lens defining a convex surface directed to an object, a second, biconcave lens, and a third, biconvex lens. At least one of the three lenses is formed of plastic. It is recommended to satisfy the following conditional expression:

$$0.1f < f_1 + f_2 < 0.2f$$

where f is a focal length of the entire lens system, $f_1$ is a focal length of said first lens, and $f_2$ is a focal length of said second lens.

8 Claims, 20 Drawing Sheets

FIG.1
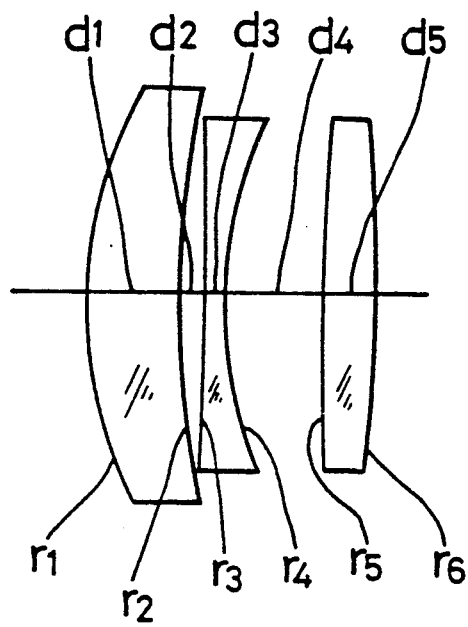
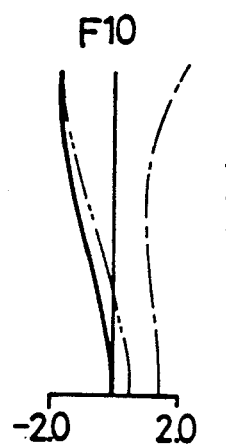
FIG. 2a
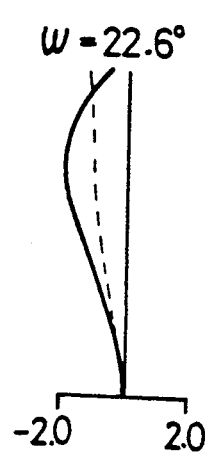
FIG. 2b
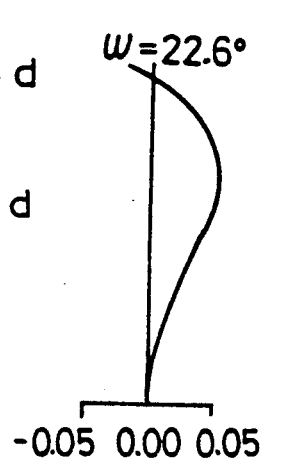
FIG. 2c

FIG. 3
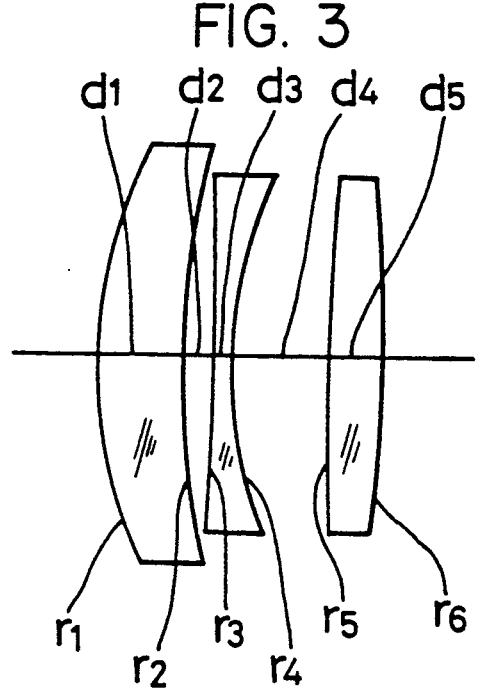
FIG. 4a
F10
── d
─·─ g
─··─ c
-2.0  2.0
SPHERICAL
ABERRATION
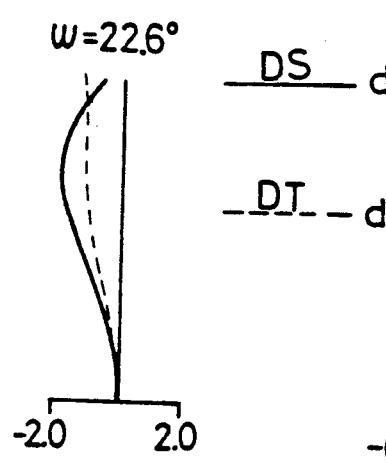
FIG. 4b
ω=22.6°
──── DS ── d
──── DT ── d
-2.0  2.0
ASTIGMATISM
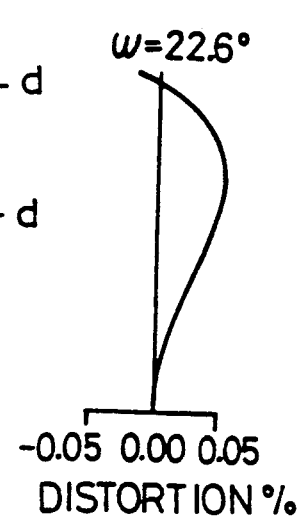
FIG. 4c
ω=22.6°
-0.05 0.00 0.05
DISTORTION %

SPHERICAL
ABERRATION

ASTIGMATISM

DISTORTION %

SPHERICAL ABERRATION

ASTIGMATISM

DISTORTION%

F10

——— d
—·—·— g
—··—··— c

SPHERICAL ABERRATION

ω=22.6°

DS ——— d
DT ----- d

ASTIGMATISM

ω=22.6°

DISTORTION %

SPHERICAL ABERRATION

ASTIGMATISM

DISTORTION %

FIG. 13
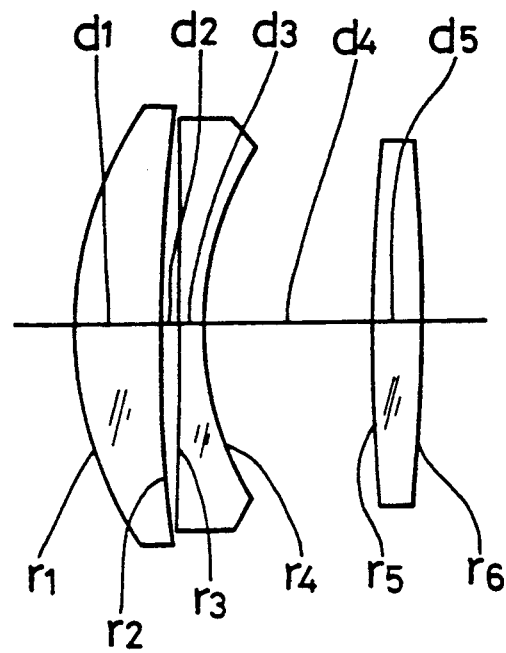
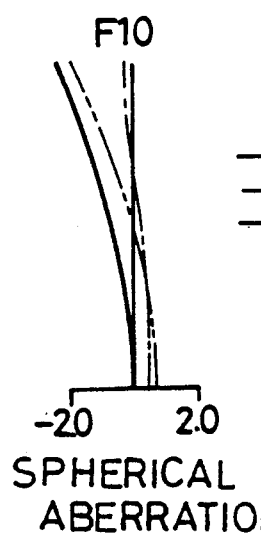
FIG. 14a
SPHERICAL
ABERRATION
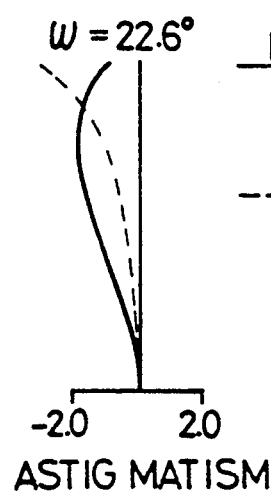
FIG. 14b
ASTIGMATISM
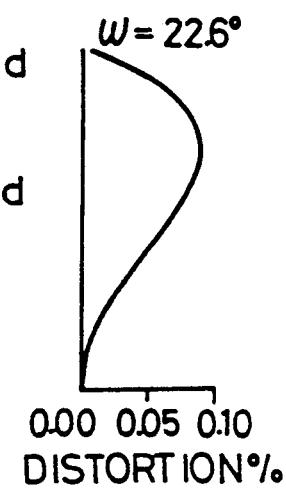
FIG. 14c
DISTORTION%

F10

SPHEREICAL
ABERRATION

ω=22.6°

ASTIGMATISM

ω=22.6°

DISTORTION %

F10

-2.0   2.0
SPHERICAL
ABERRATION

W = 22.6°

DS —— d
DT --- d

-2.0   2.0
ASTIGMATISM

W = 22.6°

-0.05 0.00 0.05
DISTORTION%

FIG. 19
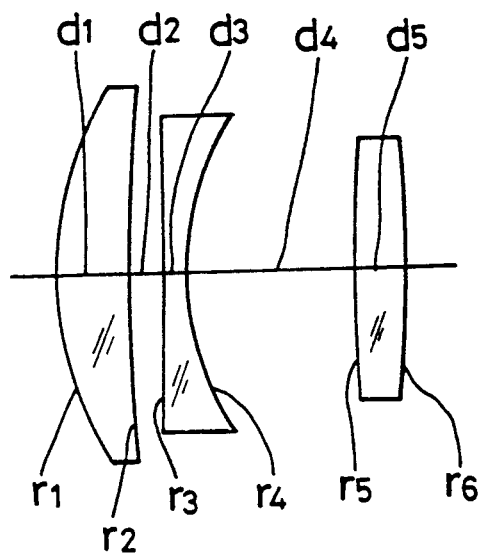
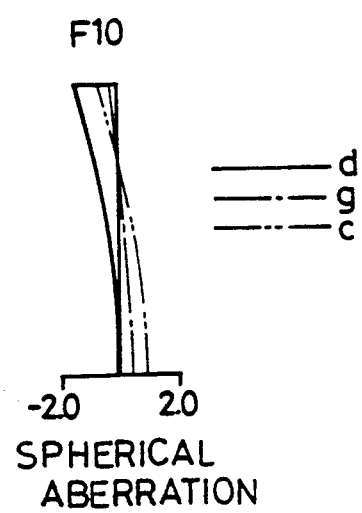
FIG. 20a
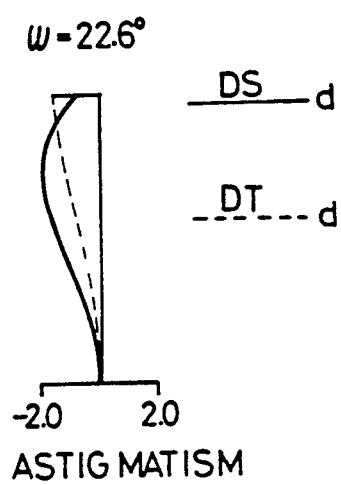
FIG. 20b
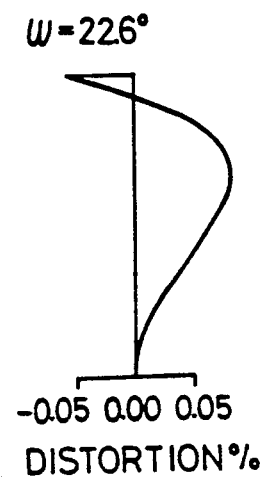
FIG. 20c

FIG. 21
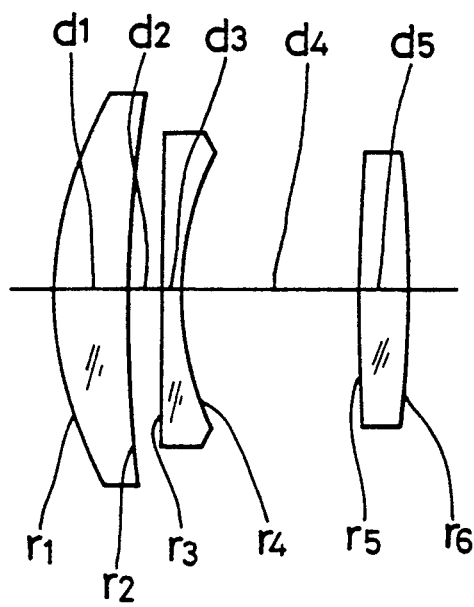
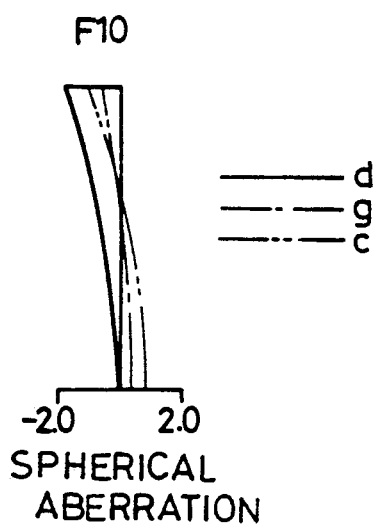
FIG. 22a
F10
-2.0  2.0
SPHERICAL ABERRATION
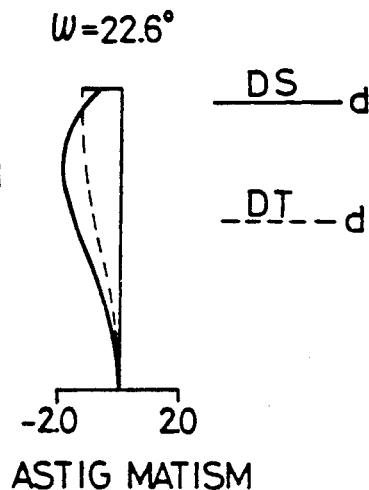
FIG. 22b
W=22.6°
DS ——— d
DT --- d
-2.0  2.0
ASTIGMATISM
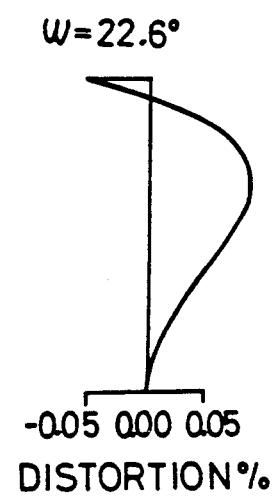
FIG. 22c
W=22.6°
-0.05 0.00 0.05
DISTORTION %

FIG. 23
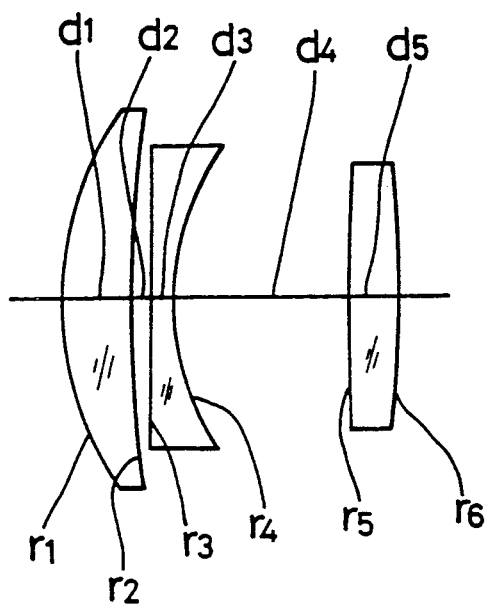
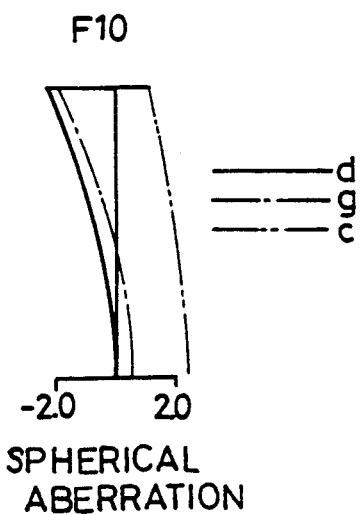
FIG. 24a
F10
SPHERICAL
ABERRATION
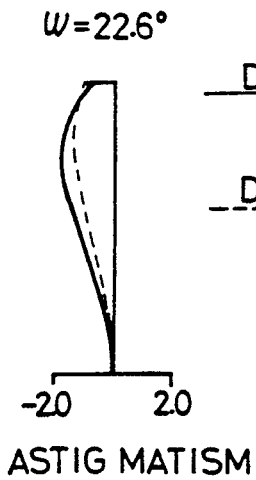
FIG. 24b
w=22.6°
ASTIGMATISM
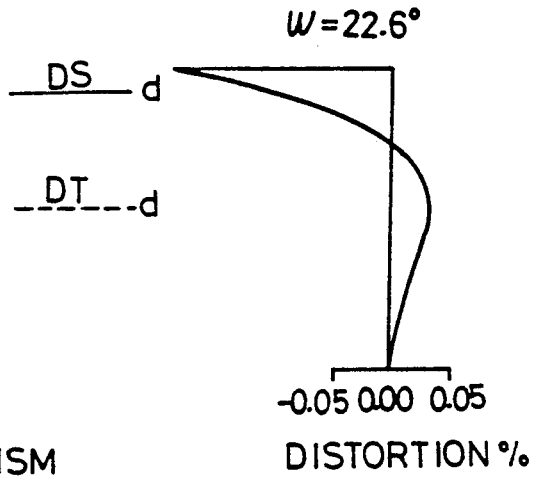
FIG. 24c
w=22.6°
DISTORTION %

FIG. 25
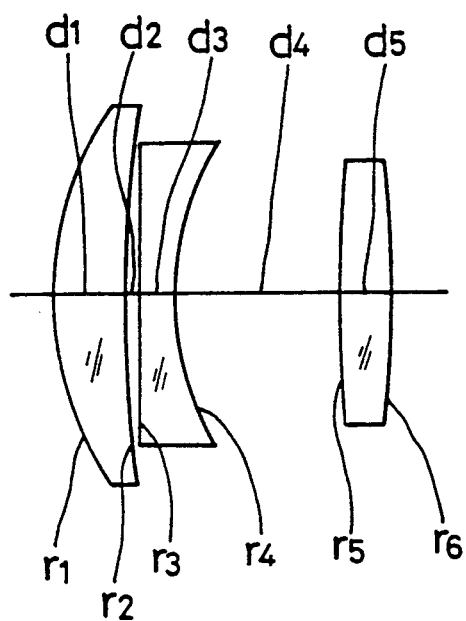
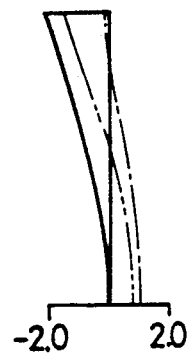
FIG. 26a
F10
-2.0  2.0
SPHERICAL
ABERRATION
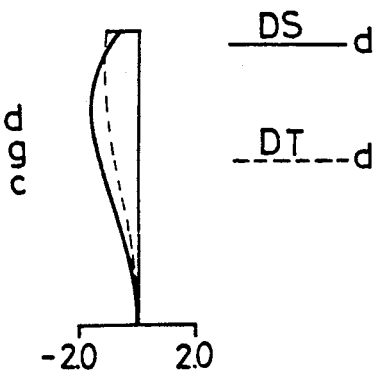
FIG. 26b
ω=22.6°
———— DS —— d
----- DT ---- d
-2.0  2.0
ASTIGMATISM
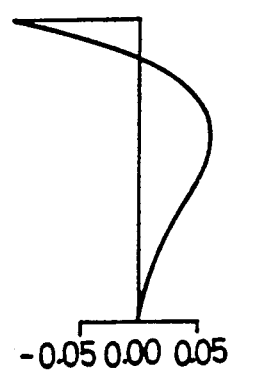
FIG. 26c
ω=22.6°
-0.05 0.00 0.05
DISTORTION%

F10

SPHERICAL
ABERRATION

W=22.6°

ASTIGMATISM

W=22.6°

DISTORTION%

F10

—2.0    2.0

SPHERICAL
ABERRATION

ω=22.6°

DS ——— d
DT --- d

—2.0    2.0

ASTIGMATISM

ω=22.6°

—0.05 0.00 0.05

DISTORTION%

F10

SPHERICAL
ABERRATION w = 22.6°

ASTIGMATISM w = 22.6°

DISTORTION %

F10

-2.0    2.0
SPHERICAL
ABERRATION

ω=22.6°

DS ——— d
DT --- d

-2.0    2.0
ASTIGMATISM

ω=22.6°

-0.05 0.00 0.05
DISTORTION%

F10

-2.0   2.0
SPHERICAL
ABERRATION

W=22.6°

——— DS —d
- - - DT - -d

-2.0   2.0
ASTIGMATISM

W=22.6°

-0.05 0.00 0.05
DISTORTION%

F10

SPHERICAL
ABERRATION

ω=22.6°

ASTIGMATISM

ω=22.6°

DISTORTION%

F10

-2.0  2.0
SPHERICAL
ABERRATION

ω=22.6°

————— DS _d
— — — DT _ _d

-2.0  2.0
ASTIGMATISM

ω=22.6°

-0.05 0.00 0.05
DISTORTION %

LENS SYSTEM FOR A COPYING MACHINE

This is a continuation of application Ser. No. 07/499,096, filed on Mar. 26, 1990, for a LENS SYSTEM FOR A COPYING MACHINE, now abandoned.

BACKGROUND OF THE INVENTION

1. Field of the Invention

This invention relates to a compact three group, three component lens system for use in a copying machine.

2. Description of the Prior Art

Generally, the conventional lens system used in a copying machine or the like includes four to six lenses. Further, the lens system of a copying machine or the like usually is used in a realsize range, and comprises a symmetric type lens system for avoiding distortion, aberration and the like.

With the copying machine becoming compact in recent years, there have been increasing demands for the lens system used therein to be compact, lightweight and low cost. Thus, a lens system having excellent performance with a reduced number of lenses is desired.

To date, however, a three component lens system for use in a copying machine has been non-existent.

SUMMARY OF THE INVENTION

An object of this invention is to provide a lens system for use in a copying machine, which has a reduced number of lenses to realize low cost, compactness and excellent performance.

The above object is fulfilled, according to this invention, by a three group, three component lens system comprising, in order from one side, a first, positive meniscus lens defining a convex surface directed to an object, a second lens having a negative power, and a third lens having a positive power, wherein at least one of the three lenses is formed of plastic.

In another aspect of this invention, the above object is fulfilled by a three group, three component lens system comprising, in order from one side, a first positive meniscus lens defining a convex surface directed to an object, a second, biconcave lens, and a third, biconvex lens, wherein at least one of the three lenses is formed of plastic. In each of the lens systems noted above, one of the three lenses is formed of plastic to realize low cost and lightness. These lens systems are comparable to or exceed the conventional lens systems in performance. Further, the lens systems of this invention are compact with a reduced total length, which contributes toward compactness of an entire copying machine.

The foregoing and other objects, features and advantages of the invention will be apparent from the following more particular description of preferred embodiments of the invention, as illustrated in the accompanying drawings.

BRIEF DESCRIPTION OF THE DRAWINGS

FIG. 1 is a sectional view of a lens system according to a first embodiment of this invention.

FIGS. 2a, 2b, and 2c are showing aberration curves of the lens system shown in FIG. 1, FIG. 3 is a sectional view of a lens system according to a second embodiment of this invention, FIGS. 4a, 4b, and 4c are views showing aberration curves of the lens system shown in FIG. 3, FIG. 13 is a sectional view of a lens system according to a seventh embodiment of this invention, FIGS. 14a, 14b, and 14c are views showing aberration curves of the lens system shown in FIG. 13, FIG. 19 is a sectional view of a lens system according to a tenth embodiment of this invention, FIGS. 20a, 20b, and 20c are views showing aberration curves of the lens system shown in FIG. 19, FIG. 21 is a sectional view of a lens system according to an eleventh embodiment of this invention, FIGS. 22a, 22b, and 22c are views showing curves of the lens system shown in FIG. 21, FIG. 23 is a sectional view of a lens system according to a twelfth embodiment of this invention, FIGS. 24a, 24b, and 24c are views showing aberration curves of the lens system shown in FIG. 23, FIG. 25 is a sectional view of a lens system according to a thirteenth embodiment of this invention, FIGS. 26a, 26b, and 26c are views showing aberration curves of the lens system shown in FIG. 25.

DESCRIPTION OF THE PREFERRED EMBODIMENT

Figure 5:
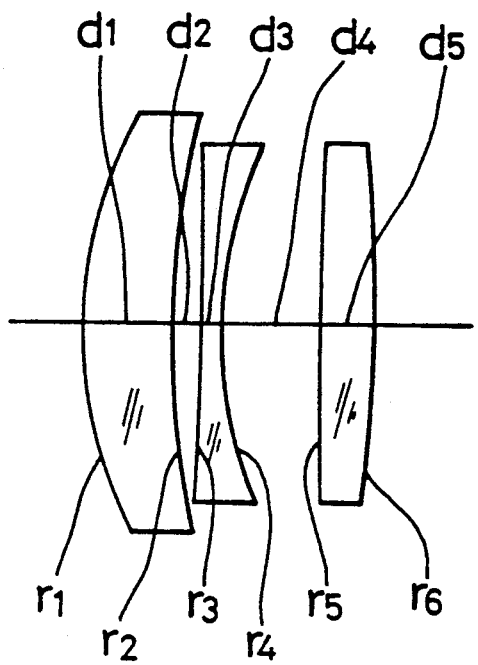
FIG. 5 is a sectional view of a lens system according to a third embodiment of this invention.

FIGS. 1, 3 and 5 are sectional views showing lens systems according to a first to a third embodiments of this invention, respectively. Each of these lens systems comprises a three group, three component lens system including, from the left side opposed to an object, a first, positive meniscus lens element having a convex surface directed to the object, a second, biconcave lens element, and a third, biconvex lens element. Each lens system has an F-number F10 and an angle of view 2 $\omega$=45.2°.

These lens systems satisfy the following conditional expressions:

$$0.1f < f_1 + f_2 < 0.2f \quad [1]$$

$$0.03f < d_4 < 0.05f \quad [2]$$

$$40 < \frac{\nu_1 + \nu_3}{2} < 50 \quad [3]$$

$$1.67 < \frac{N_1 + N_3}{2} < 1.75 \quad [4]$$

$$0.18 < \frac{r_4}{r_5} < 0.23 \quad [5]$$

where f is a focal length of each entire system, $f_1$ is a focal length of the first lens element, $f_2$ is a focal length of the second lens element, $\nu_1$ is Abbe number of the first lens element, $\nu_3$ is Abbe number of the third lens element, $d_4$ is an axial distance between the second and third lens elements, $N_1$ is a refractive index at line d of the first lens element, $N_3$ is a refractive index at line d of the third lens element, $r_4$ is a radius of curvature of the rear surface of the second lens element, and $r_5$ is a radius of curvature of the front surface of the third lens element.

The conditional expression [1] is one for determining the sum of focal lengths of the first and second lens elements and for suppressing mainly spherical aberration. Compensation for spherical aberration will be excessive in the event of a deviation from the upper limit of the conditional expression [1]. Below its lower limit, compensation for spherical aberration becomes insufficient and astigmatism becomes excessive, thereby causing a tilt of the image plane.

The conditional expression [2] is one for determining the axial distance between the second and third lens elements. Coma flare becomes excessive in the event of a deviation from the lower limit, thereby reducing the contrast of an image. Above its upper limit, compensation for distortion becomes insufficient. This produces the undesirable result of enlarging the lens.

The conditional expression [3] shows a condition regarding Abbe numbers of the first and third lens elements for compensating for chromatic aberration. A sufficient compensation for chromatic aberration is impossible in the event of a deviation from its upper limit or lower limit.

The conditional expression [4] shows a condition regarding the refractive index of a material forming the first and third lens elements for compensating for various aberrations. A sufficient compensation for coma and distortion is impossible in the event of a deviation from this conditional expression.

The conditional expression [5] shows a condition regarding an air lens between the second and third lens elements for reliably compensating for coma, spherical aberration and the like. In the event of a deviation from its upper limit, comas become excessive and compensation for spherical aberration becomes insufficient. Below its lower limited, compensation for spherical aberration becomes excessive.

In addition, image plane characteristics become poor with a deterioration in performance occurring in peripheral regions.

In each of the lens systems according to the first to third embodiments of this invention, one of the three lens elements is formed of plastic which allows the lens system to be lightweight and enables mass production through a shaping process. By providing the plastic lens element with an aspheric surface or surfaces, an increased freedom is secured for aberration compensation, to be able to compensate for various aberrations even with a reduced total thickness of the lenses. Moreover, each lens system having the improved performance, although it includes only three lens elements, realizes excellent image forming characteristics comparable to or exceeding those of the known lens system used for copying purposes.

TABLE 1

| f = 180 FNo. = 10.0 | | | | | | |
|---|---|---|---|---|---|---|
| RADIUS OF CURV. | | AXIAL DISTANCE | | REFRACT.IND.(Nd) | | ABBE No.(νd) |
| $r_1$ | 30.69 | | | | | |
| | | $d_1$ | 6.40 | $N_1$ 1.7620 | $\nu_1$ | 40.4 |
| $r_2$ | 59.19 | | | | | |
| | | $d_2$ | 1.75 | | | |
| $r_3$* | −359.51 | | | | | |
| | | $d_3$ | 1.60 | $N_2$ 1.5840 | $\nu_2$ | 31.0 |
| $r_4$ | 31.96 | | | | | |
| | | $d_4$ | 6.61 | | | |
| $r_5$ | 154.79 | | | | | |
| | | $d_5$ | 3.71 | $N_3$ 1.6710 | $\nu_3$ | 51.7 |
| $r_6$ | −101.99 | | | | | |
| | | $\Sigma d = 20.06$ | | | | |

| ASPHERICAL SURFACE COEFFICIENT | | |
|---|---|---|
| $r_3$:$A_2$ = 0.0, | $A_3$ = 0.0, | $A_4$ = 0.10187 × $10^{-6}$ |
| $A_5$ = 0.0, | $A_6$ = −0.33078 × $10^{-8}$, | $A_7$ = 0.0 |
| $A_8$ = 0.42019 × $10^{-10}$, | $A_9$ = 0.0, | $A_{10}$ = −0.34244 × $10^{-12}$ |
| $A_{11}$ = 0.0, | $A_{12}$ = 0.13075 × $10^{-14}$, | $A_{13}$ = 0.0 |
| $A_{14}$ = 0.0, | $A_{15}$ = 0.0, | $A_{16}$ = 0.0 |

Tables 1 to 3 show numeric values for radii of curvature, axial distances, refractive indices at line d and Abbe numbers of the lens elements in the respective embodiments. In each of these embodiments, the second lens element has an aspheric surface opposed to the first lens element, and coefficients of the aspheric surface are shown in the bottom of each table.

The aspheric surface is expressed by $x=f(y,z)$ where x is the optical axis and rectangular coordinates y and z are located on a plane of apex $x=0$. If $y^2+z^2=\phi^2$, $$x = \frac{C_o\phi^2}{1 + \sqrt{1 - C_o\phi^2}} + \Sigma A_i\phi^i$$

In the above equation, the coefficient of the aspheric surface is the value of Ai, and Co is an inverse of the radius of curvature. Use of such an aspheric surface realizes an increased freedom of aberration compensation to enable a reliable compensation for various aberrations.

Figure 6A:
FIGS. 6a, 6b, and 6c are views showing aberration curves of the lens system shown in FIG. 5.
Figure 6B:
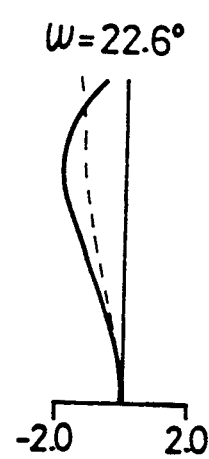
Figure 6C:
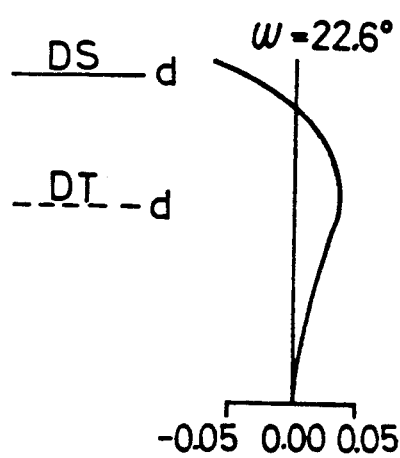

FIGS. 2, 4 and 6 show aberration curves in the first to third embodiment at $-1x$. Each lens system has a focal length $f=180$ mm and a half angle of view $\omega=22.6°$.

TABLE 3

| f = 180 FNo. = 10.0 RADIUS OF CURV. | | AXIAL DISTANCE | | REFRACT.IND.(Nd) | | ABBE No.(νd) |
|---|---|---|---|---|---|---|
| $r_1$ | 31.02 | | | | | |
| | | $d_1$ | 6.00 | $N_1$ 1.7810 | $\nu_1$ | 44.6 |
| $r_2$ | 59.43 | | | | | |
| | | $d_2$ | 1.99 | | | |
| $r_3^*$ | −347.36 | | | | | |
| | | $d_3$ | 1.60 | $N_2$ 1.5840 | $\nu_2$ | 31.0 |
| $r_4$ | 32.24 | | | | | |
| | | $d_4$ | 6.70 | | | |
| $r_5$ | 158.04 | | | | | |
| | | $d_5$ | 3.70 | $N_3$ 1.6689 | $\nu_3$ | 45.0 |
| $r_6$ | −101.74 | | | | | |
| | | $\Sigma d =$ 19.98 | | | | |

| ASPHERICAL SURFACE COEFFICIENT | | |
|---|---|---|
| $r_3:A_2 = 0.0,$ | $A_3 = 0.0,$ | $A_4 = 0.19315 \times 10^{-6}$ |
| $A_5 = 0.0,$ | $A_6 = -0.33084 \times 10^{-8},$ | $A_7 = 0.0$ |
| $A_8 = 0.30302 \times 10^{-10},$ | $A_9 = 0.0,$ | $A_{10} = -0.36069 \times 10^{-12}$ |
| $A_{11} = 0.0,$ | $A_{12} = 0.23325 \times 10^{-14},$ | $A_{13} = 0.0$ |
| $A_{14} = 0.0,$ | $A_{15} = 0.0,$ | $A_{16} = 0.0$ |

TABLE 2

| f = 180 FNo. = 10.0 RADIUS OF CURV. | | AXIAL DISTANCE | | REFRACT.IND.(Nd) | | ABBE No.(νd) |
|---|---|---|---|---|---|---|
| $r_1$ | 30.63 | | | | | |
| | | $d_1$ | 6.00 | $N_1$ 1.7620 | $\nu_1$ | 40.4 |
| $r_2$ | 60.85 | | | | | |
| | | $d_2$ | 1.99 | | | |
| $r_3^*$ | −314.28 | | | | | |
| | | $d_3$ | 1.59 | $N_2$ 1.5840 | $\nu_2$ | 31.0 |
| $r_4$ | 31.60 | | | | | |
| | | $d_4$ | 6.48 | | | |
| $r_5$ | 150.13 | | | | | |
| | | $d_5$ | 3.71 | $N_3$ 1.6783 | $\nu_3$ | 49.0 |
| $r_6$ | −104.14 | | | | | |
| | | $\Sigma d =$ 19.77 | | | | |

| ASPHERICAL SURFACE COEFFICIENT | | |
|---|---|---|
| $r_3:A_2 = 0.0,$ | $A_3 = 0.0,$ | $A_4 = 0.31706 \times 10^{-6}$ |
| $A_5 = 0.0,$ | $A_6 = -0.33081 \times 10^{-8},$ | $A_7 = 0.0$ |
| $A_8 = 0.38113 \times 10^{-10},$ | $A_9 = 0.0,$ | $A_{10} = -0.34801 \times 10^{-12}$ |
| $A_{11} = 0.0,$ | $A_{12} = 0.16932 \times 10^{-14},$ | $A_{13} = 0.0$ |
| $A_{14} = 0.0,$ | $A_{15} = 0.0,$ | $A_{16} = 0.0$ |

Table 4 shows numeric values for the foregoing conditional expressions for the first to third embodiments, and numeric values for the total thickness $\Sigma d$ indicative of compactness.

Figure 7:
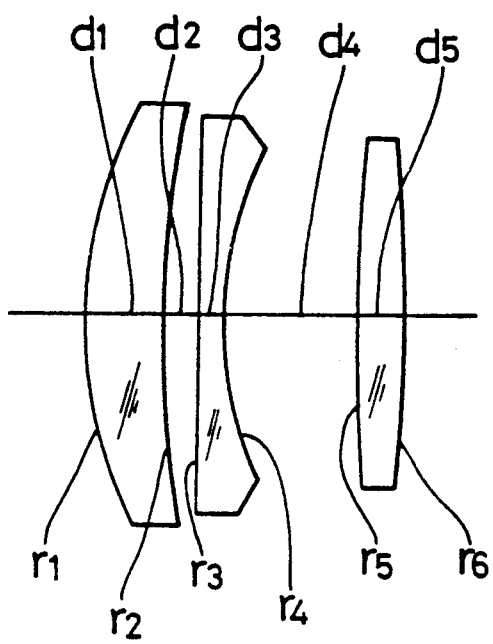
FIG. 7 is a sectional view of a lens system according to a fourth embodiment of this invention.
Figure 9:
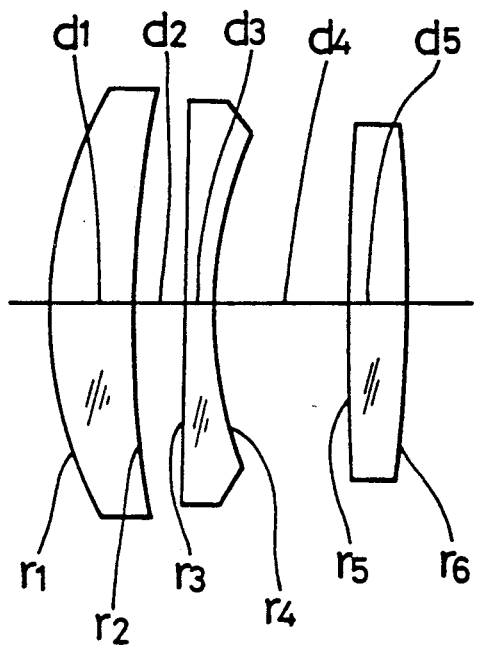
FIG. 9 is a sectional view of a lens system according to a fifth embodiment of this invention.
Figure 11:
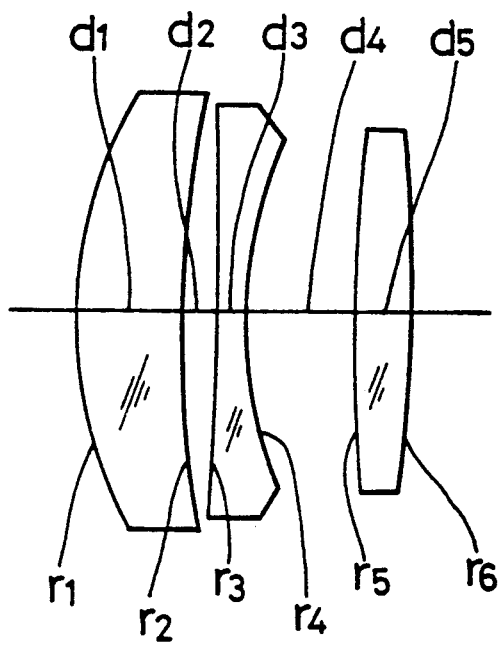
FIG. 11 is a sectional view of a lens system according to a sixth embodiment of this invention.

A fourth to a seventh embodiments will be described next. No aspheric surface is employed in these embodiments. FIGS. 7, 9 and 11 shows lens arrangements in these embodiments. Each of the illustrated lens systems includes, from the left side opposed to an object, a first, positive meniscus lens element having a convex surface directed to the object, a second, biconcave lens element, and a third, biconvex lens element. The second, biconcave lens is formed of a plastic material.

TABLE 4

| | [1] $0.1f < f_1 + f_2 < 0.2f$ | [2] $0.03f < d_4 < 0.05f$ | [3] $40 < \dfrac{\nu_1 + \nu_3}{2} < 50$ | [4] $1.67 < \dfrac{N_1 + N_3}{2} < 1.75$ | [5] $0.18 < \dfrac{r_4}{r_5} < 0.23$ | $\Sigma d$ |
|---|---|---|---|---|---|---|
| EMBODIMENT 1 | 0.145f | 0.0367f | 46.05 | 1.7165 | 0.206 | 0.111f |
| EMBODI- | 0.141f | 0.0360f | 44.7 | 1.7202 | 0.210 | 0.110f |

TABLE 4-continued

| | [1]<br>$0.1f < f_1 + f_2 < 0.2f$ | [2]<br>$0.03f < d_4 < 0.05f$ | [3]<br>$40 < \frac{\nu_1 + \nu_3}{2} < 50$ | [4]<br>$1.67 < \frac{N_1 + N_3}{2} < 1.75$ | [5]<br>$0.18 < \frac{r_4}{r_5} < 0.23$ | $\Sigma d$ |
|---|---|---|---|---|---|---|
| MENT 2 | | | | | | |
| EMBODIMENT 3 | 0.142f | 0.0372f | 44.8 | 1.7250 | 0.204 | 0.111f |

These lens system satisfy the following conditional expressions:

$$0.04f < f_1 + f_2 < 0.02f \quad [6]$$

$$0.10 < \frac{r_4}{r_5} < 0.25 \quad [7]$$

$$40 < \frac{\nu_1 + \nu_3}{2} < 50 \quad [8]$$

$$0.05f < d_4 < 0.08f \quad [9]$$

where f is a focal length of each entire system, $f_1$ is a focal length of the first lens element, $f_2$ is a focal length of the second lens element, $r_4$ is a radius of curvature of the rear surface of the second lens element, $r_5$ is a radius of curvature of the front surface of the third lens element, $\nu_1$ and $\nu_3$ are Abbe numbers of the first and third lens elements, respectively, and $d_4$ is an axial distance between the second and third lens elements.

The conditional expression [6] is one for determining the sum of focal lengths of the first and second lens elements and for suppressing mainly spherical aberration. Compensation for spherical aberration will be excessive in the event of a deviation from its upper limit. Below its lower limit, compensation for spherical aberration becomes insufficient and astigmatism becomes excessive, thereby causing a tilt of the image plane.

The conditional expression [7] shows a ratio in the radius of curvature between the second and third lens elements for reliably compensating for coma, spherical aberration and the like. In the event of a deviation from its upper limit, coma becomes excessive, and compensation for spherical aberration becomes insufficient, thereby reducing the contrast of an image. Below its lower limited, compensation for spherical aberration becomes excessive. In addition, image plane characteristics become poor with a deterioration in performance occurring in peripheral regions of an image.

The conditional expression [8] shows a condition regarding Abbe numbers of the first and third lens elements for compensating for chromatic aberration. A sufficient compensation for chromatic aberration is impossible in the event of a deviation from its upper limit or lower limit.

The conditional expression [9] is one for determining the axial distance between the second and third lens elements. In the event of a deviation from its upper limit or lower limit, compensation for distortion becomes insufficient. A deviation from the upper limit produces the undesirable result of enlarging the lens.

TABLE 5

| f = 180 FNo. = 8.0 | | | | | | | |
|---|---|---|---|---|---|---|---|
| RADIUS OF CURV. | | AXIAL DISTANCE | | REFRACT.IND.(Nd) | | ABBE No.(νd) | |
| $r_1$ | 36.24 | | | | | | |
| | | $d_1$ | 7.20 | $N_1$ | 1.7810 | $\nu_1$ | 44.6 |
| $r_2$ | 95.84 | | | | | | |
| | | $d_2$ | 3.30 | | | | |
| $r_3$ | −870.98 | | | | | | |
| | | $d_3$ | 2.31 | $N_2$ | 1.5840 | $\nu_2$ | 31.0 |
| $r_4$ | 33.44 | | | | | | |
| | | $d_4$ | 11.61 | | | | |
| $r_5$ | 167.05 | | | | | | |
| | | $d_5$ | 4.00 | $N_3$ | 1.6661 | $\nu_3$ | 48.0 |
| $r_6$ | −168.83 | | | | | | |
| | | | $\Sigma d = 28.41$ | | | | |

TABLE 6

| f = 180 FNo. = 10.0 | | | | | | | |
|---|---|---|---|---|---|---|---|
| RADIUS OF CURV. | | AXIAL DISTANCE | | REFRACT.IND.(Nd) | | ABBE No.(νd) | |
| $r_1$ | 38.07 | | | | | | |
| | | $d_1$ | 7.20 | $N_1$ | 1.7810 | $\nu_1$ | 44.6 |
| $r_2$ | 100.56 | | | | | | |
| | | $d_2$ | 4.54 | | | | |
| $r_3$ | −619.89 | | | | | | |
| | | $d_3$ | 2.30 | $N_2$ | 1.5840 | $\nu_2$ | 31.0 |
| $r_4$ | 35.26 | | | | | | |
| | | $d_4$ | 11.75 | | | | |
| $r_5$ | 165.86 | | | | | | |
| | | $d_5$ | 4.81 | $N_3$ | 1.6935 | $\nu_3$ | 50.3 |
| $r_6$ | −178.80 | | | | | | |
| | | | $\Sigma d = 30.60$ | | | | |

TABLE 7

| f = 180 FNo. = 10.0 RADIUS OF CURV. | | AXIAL DISTANCE | | REFRACT.IND.(Nd) | | ABBE No.(νd) |
|---|---|---|---|---|---|---|
| $r_1$ | 38.14 | | | | | |
| | | $d_1$ | 8.50 | $N_1$ 1.7885 | $\nu_1$ | 45.7 |
| $r_2$ | 81.78 | | | | | |
| | | $d_2$ | 3.20 | | | |
| $r_3$ | −330.87 | | | | | |
| | | $d_3$ | 2.70 | $N_2$ 1.5840 | $\nu_2$ | 31.0 |
| $r_4$ | 37.55 | | | | | |
| | | $d_4$ | 9.23 | | | |
| $r_5$ | 164.21 | | | | | |
| | | $d_5$ | 4.50 | $N_3$ 1.7003 | $\nu_3$ | 47.7 |
| $r_6$ | −133.90 | | | | | |
| | | $\Sigma d = 28.13$ | | | | |

Figure 8A:
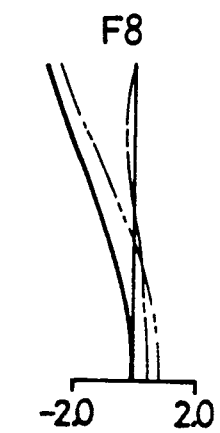
FIGS. 8a, 8b, 8c are views showing aberration curves of the lens system shown in FIG. 7.
Figure 8B:
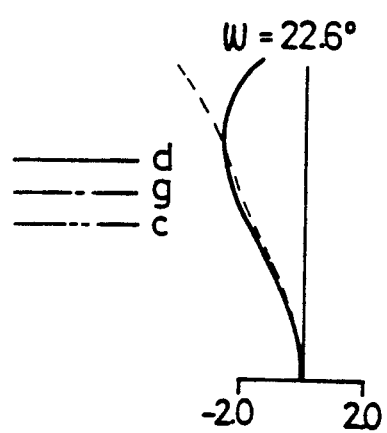
Figure 8C:
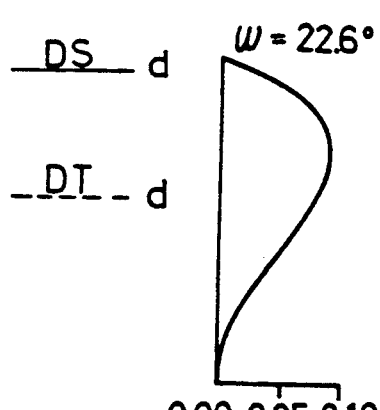
Figure 10A:
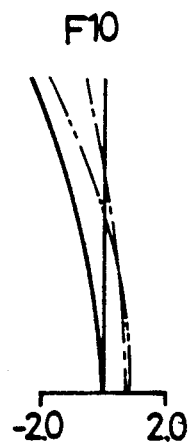
FIGS. 10a, 10b, 10c are sectional views showing aberration curves of the lens system shown in FIG. 9.
Figure 10B:
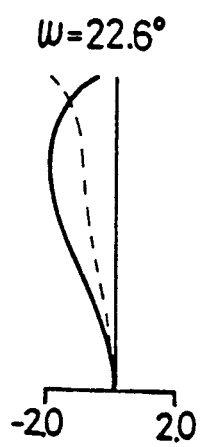
Figure 10C:
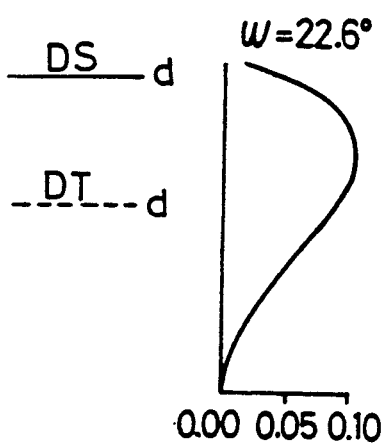
Figure 12A:
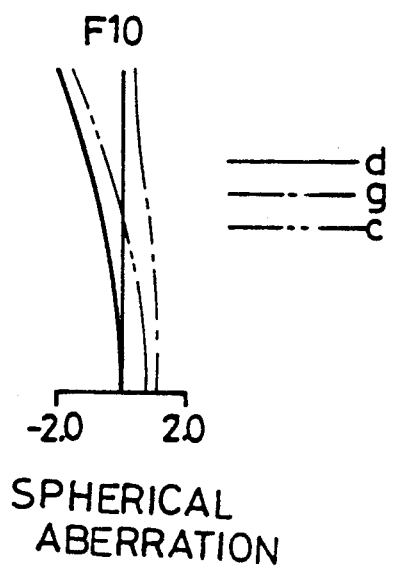
FIGS. 12a, 12b, and 12c are views showing aberration curves of the lens system shown in FIG. 11.
Figure 12B:
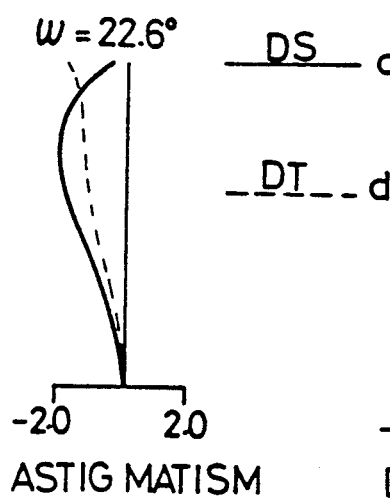
Figure 12C:
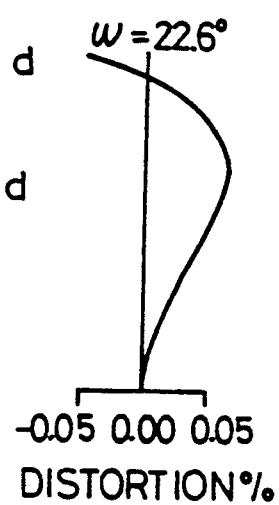
Figure 15:
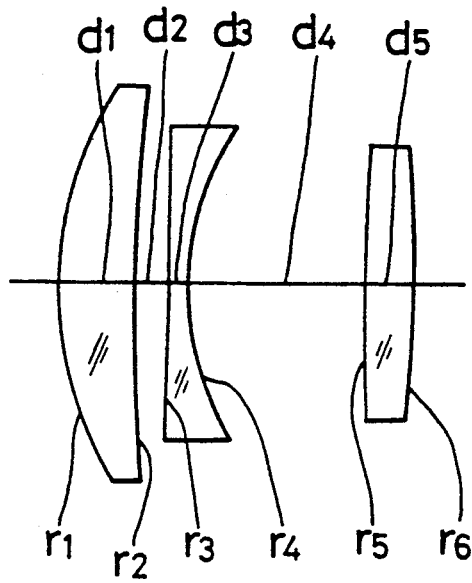
FIG. 15 is a sectional view of a lens system according to an eighth embodiment of this invention.
Figure 16A:
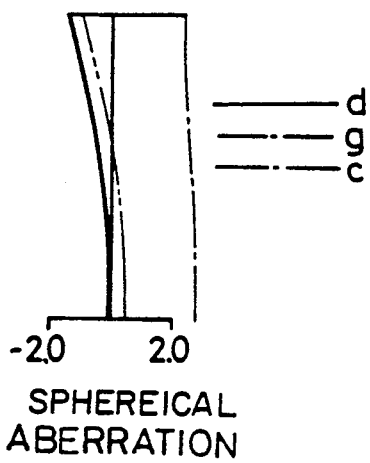
FIGS. 16a, 16b, and 16c are views showing aberration curves of the lens system shown in FIG. 15.
Figure 16B:
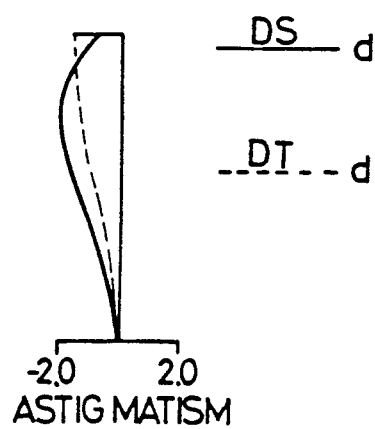
Figure 16C:
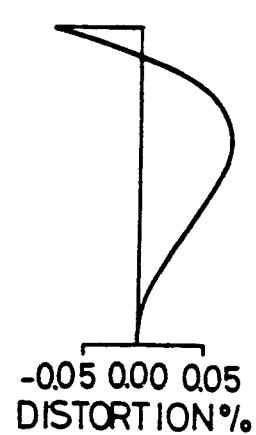
Figure 17:
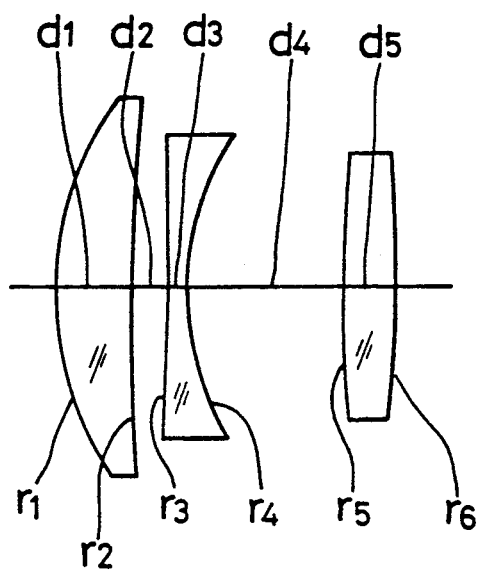
FIG. 17 is a sectional view of a lens system according to a ninth embodiment of this invention.
Figure 18A:
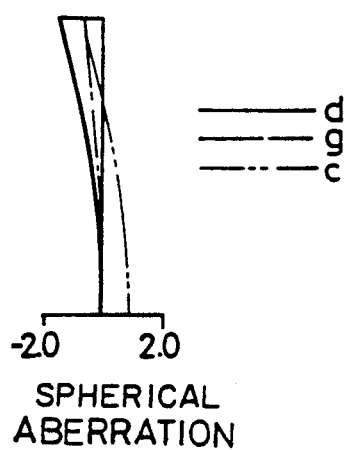
FIGS. 18a, 18b, and 18c are views showing abberation curves of the lens system shown in FIG. 17.
Figure 18B:
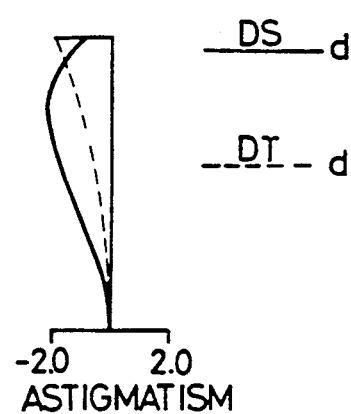
Figure 18C:
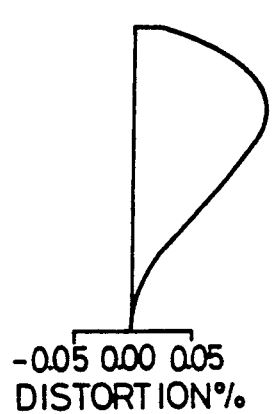
Figure 27:
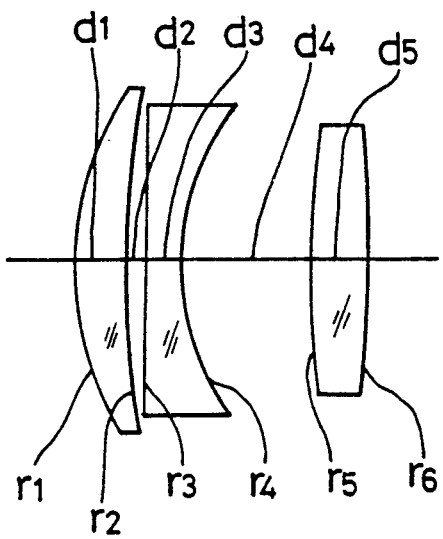
FIG. 27 is a sectional view of a lens system according to a fourteenth embodiment of this invention.
Figure 28A:
FIGS. 28a, 28b, and 28c are views showing aberration curves of the lens system shown in FIG. 27.
Figure 28B:
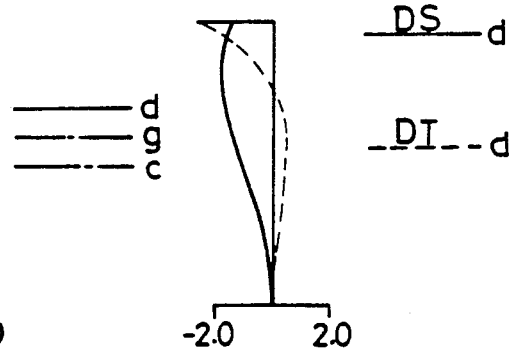
Figure 28C:
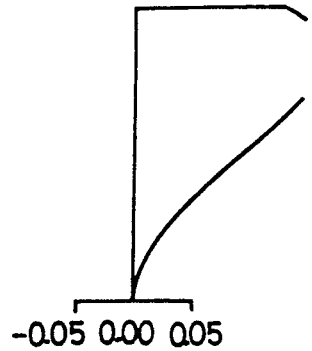
Figure 29:
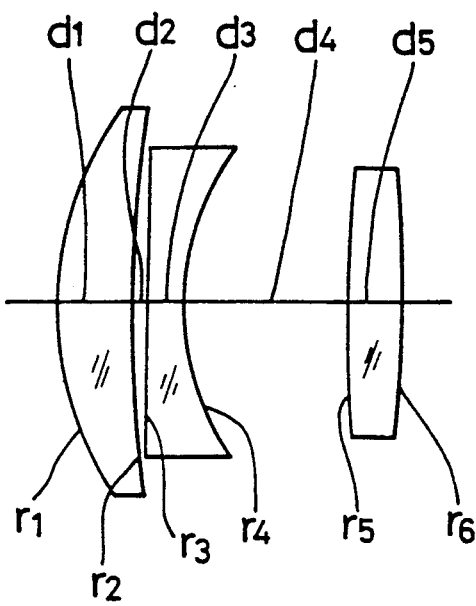
FIG. 29 is a sectional view of a lens system according to a fifteenth embodiment of this invention.
Figure 30A:
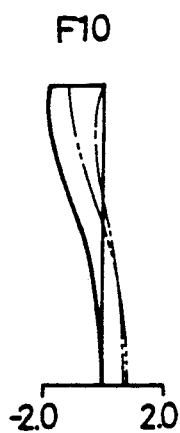
FIGS. 30a, 30b, and 30c are views showing aberration curves of the lens system shown in FIG. 29.
Figure 30B:
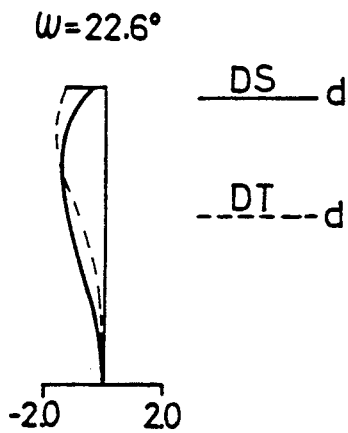
Figure 30C:
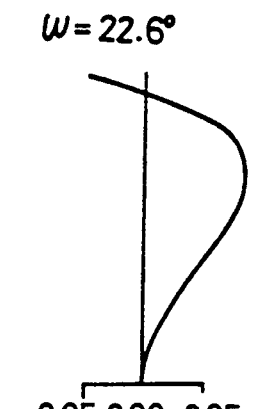
Figure 31:
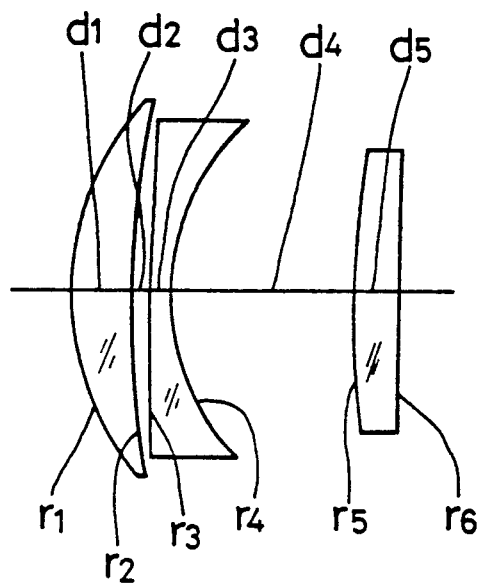
FIG. 31 is a sectional view of a lens system according to a sixteenth embodiment of this invention.
Figure 32A:
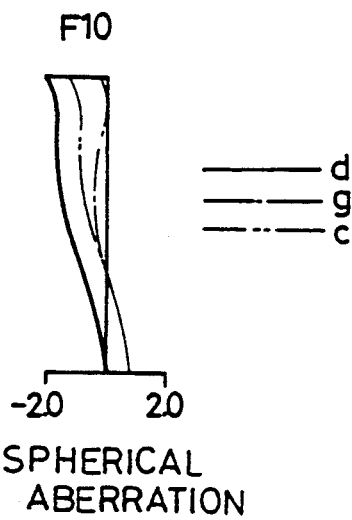
FIGS. 32a, 32b, and 32c are views showing aberration curves of the lens system shown in FIG. 31.
Figure 32B:
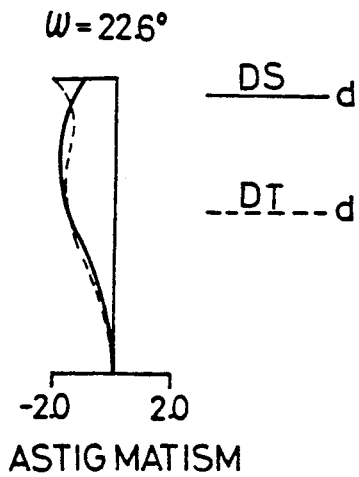
Figure 32C:
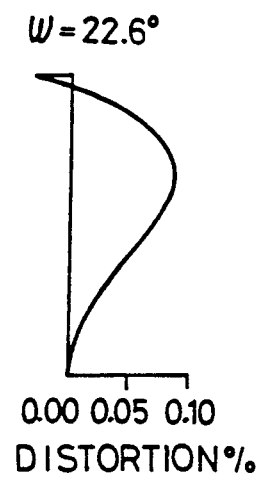
Figure 33:
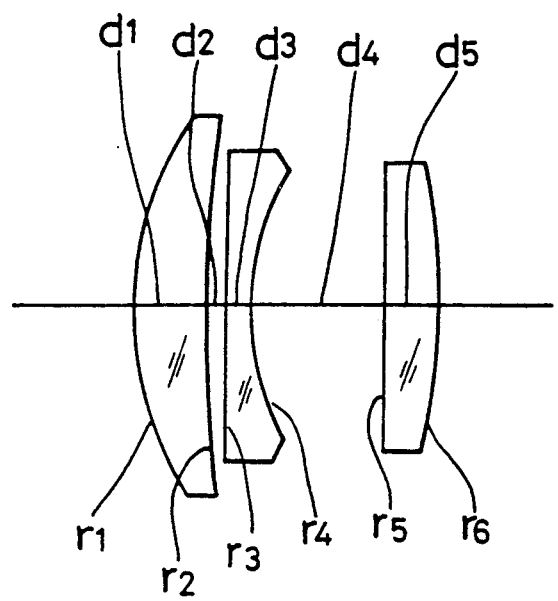
FIG. 33 is a sectional view of a lens system according to a seventeenth embodiment of this invention.
Figure 34A:
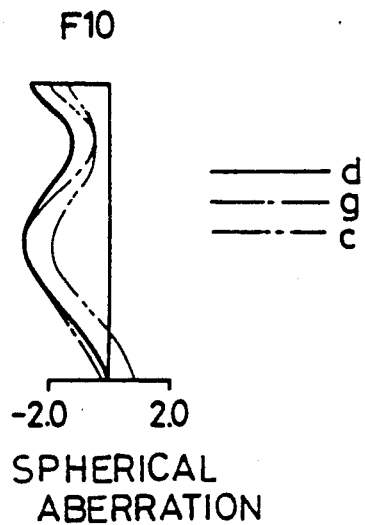
FIGS. 34a, 34b, and 34c are views showing aberration curves of the lens system shown in FIG. 33.
Figure 34B:
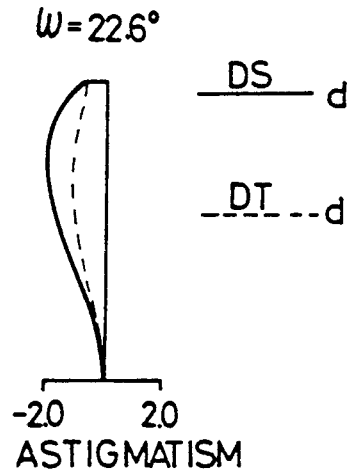
Figure 34C:
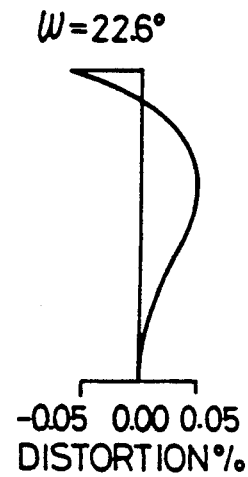
Figure 35:
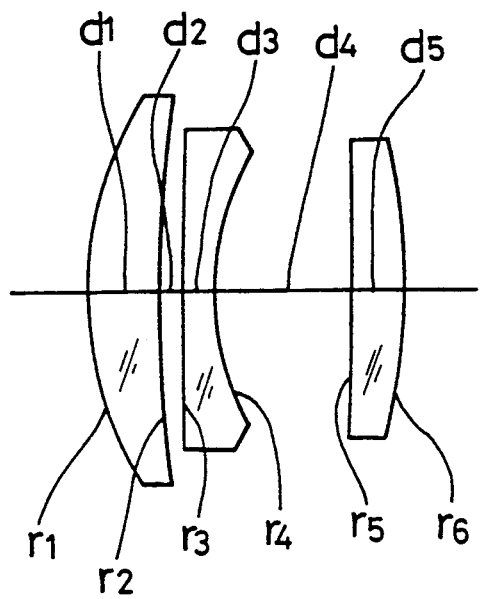
FIG. 35 is a sectional view of a lens system according to a eighteenth embodiment of this invention.
Figure 36A:
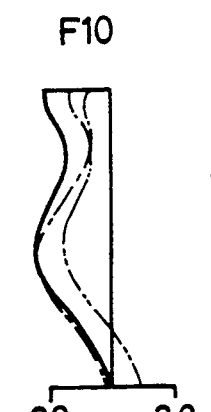
FIGS. 36a, 36b, and 36c are views showing aberration curves of the lens system shown in FIG. 35.
Figure 36B:
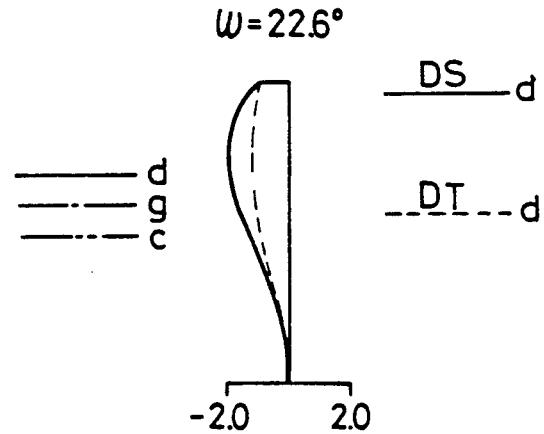
Figure 36C:
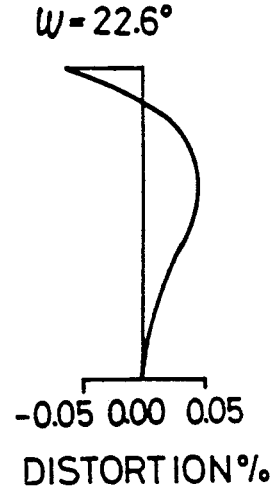
Figure 37:
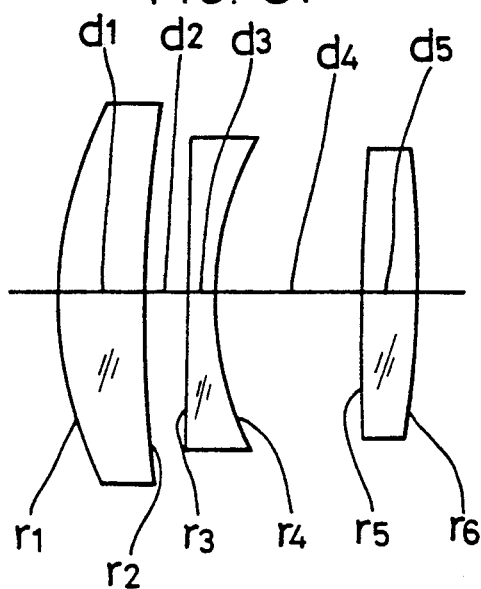
FIG. 37 is a sectional view of a lens system according to a nineteenth embodiment of this invention.
Figure 38A:
FIGS. 38a, 38b, and 38c are views showing aberration curves of the lens system shown in FIG. 37.
Figure 38B:
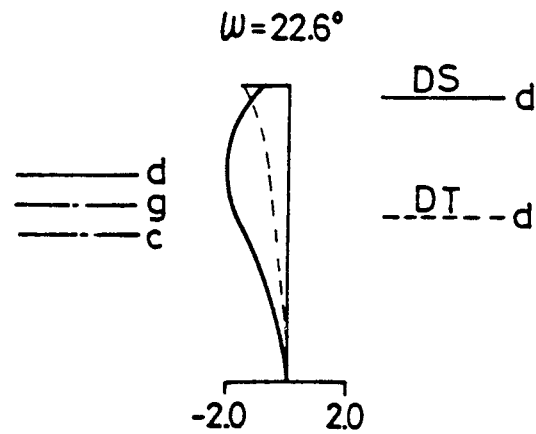
Figure 38C:
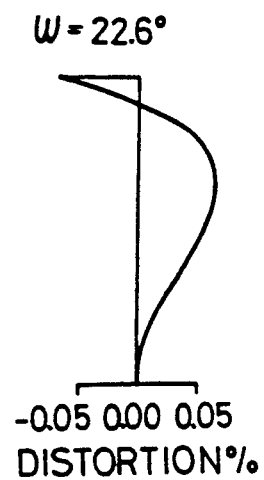
Figure 39:
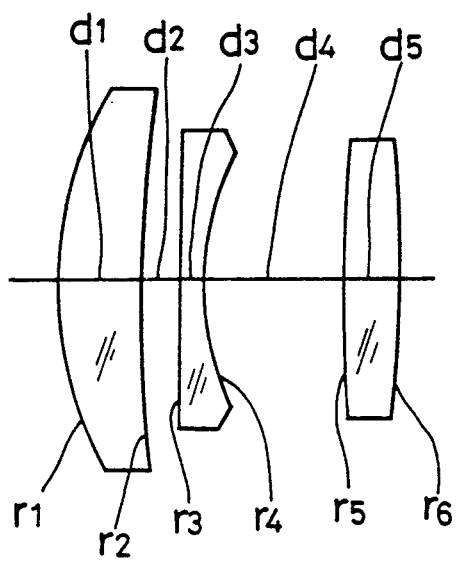
FIG. 39 is a sectional view of a lens system according to a twentieth embodiment of this invention.
Figure 40A:
FIGS. 40a, 40b, and 40c are views showing curves of the lens system shown in FIG. 39.
Figure 40B:
Figure 40C:
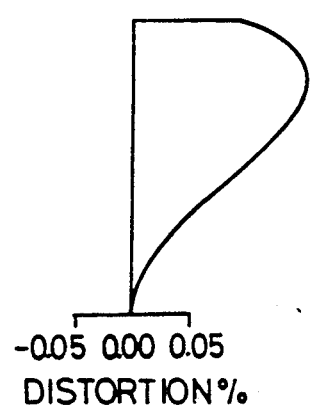

Tables 5 to 8 show numeric values for radii of curvature, axial distances, refractive indices at line d and Abbe numbers of the fourth to seventh embodiments. FIGS. 8, 10 and 12 show aberration curves in the fourth to seventh embodiments at −1x. Each lens system has a focal length f=180 mm, F-number 8 to 10 and a half angle of view ω=22.6°. Table 9 shows numeric values for the foregoing conditional expressions [6] through [9] for the fourth to seventh embodiments, and numeric values for the total thickness Σd indicative of compactness.

$$1.65 < N_1 \qquad [13]$$

$$35 < \nu_1 < 50 \qquad [14]$$

where f is a focal length of each entire system, $d_2$ is an axial distance between the first and second lens elements, $d_4$ is an axial distance between the second and third lens elements, $f_1$ is a focal length of the first lens elements, $F_2$ is a focal length of the second lens element, $N_1$ is a refractive index at line d of the first lens element,

TABLE 8

| f = 180 FNo. = 10.0 RADIUS OF CURV. | | AXIAL DISTANCE | | REFRACT.IND.(Nd) | | ABBE No.(νd) |
|---|---|---|---|---|---|---|
| $r_1$ | 31.53 | | | | | |
| | | $d_1$ | 7.20 | $N_1$ 1.7200 | $\nu_1$ | 42.0 |
| $r_2$ | 150.02 | | | | | |
| | | $d_2$ | 1.58 | | | |
| $r_3$ | −799.62 | | | | | |
| | | $d_3$ | 2.30 | $N_2$ 1.5840 | $\nu_2$ | 31.0 |
| $r_4$ | 27.85 | | | | | |
| | | $d_4$ | 14.21 | | | |
| $r_5$ | 173.54 | | | | | |
| | | $d_5$ | 4.00 | $N_3$ 1.6201 | $\nu_3$ | 49.8 |
| $r_6$ | −211.04 | | | | | |
| | | $\Sigma d = 29.29$ | | | | |

An eighth to an eleventh embodiments will be described next. FIGS. 15, 17, 19 and 21 are sectional views showing lens systems in these embodiments. Each of the lens systems comprises a three group, three component lens system including, from the left side opposed to an object, a first, positive meniscus lens element having a convex surface directed to the object, a second, biconcave lens element, and a third, biconvex lens element. Each lens system has an F-number F10 and an angle of view 2ω=45.2°.

and $\nu_1$ is Abbe number of the first lens element.

TABLE 9

| | [6] $0.04f < f_1 + f_2 < 0.2f$ | [7] $0.10 < \frac{r_4}{r_5} < 0.25$ | [8] $40 < \frac{\nu_1 + \nu_3}{2} < 50$ | [9] $0.05f < d_4 < 0.08f$ | Σd |
|---|---|---|---|---|---|
| EMBODIMENT 4 | 0.087f | 0.200 | 46.3 | 0.0645f | 0.158f |
| EMBODIMENT 5 | 0.098f | 0.213 | 47.5 | 0.0652f | 0.170f |
| EMBODIMENT 6 | 0.144f | 0.229 | 46.7 | 0.0513f | 0.156f |
| EMBODIMENT 7 | 0.045f | 0.160 | 45.9 | 0.079f | 0.163f |

These lens systems satisfy the following conditional expressions:

$$0.015f < d_2 < 0.025f \qquad [10]$$

$$0.05f < d_4 < 0.15f \qquad [11]$$

$$0.04f < f_1 + f_2 < 0.06f \qquad [12]$$

The conditional expression [10] is one for determining the axial distance between the first and second lens elements. In the event of a deviation from this condition, it is difficult to compensate for distortion, magnification and chromatic aberration in a balanced manner.

The conditional expression [11] is one for determining the axial distance between the second and third lens elements. Coma flare becomes excessive in the event of a deviation from the lower limit, thereby reducing the contrast of an image. Above its upper limit, compensation for distortion becomes insufficient. This produces the undesirable result of enlarging the lens.

The conditional expression [12] is one for determining the sum of focal lengths of the first and second lens elements and for suppressing mainly spherical aberration. Compensation for spherical aberration will be excessive in the event of a deviation from the upper limit of the conditional expression [12]. Below its lower limit, compensation for spherical aberration becomes insufficient and astigmatism becomes excessive, thereby causing a tilt of the image plane.

The conditional expressions [13] and [14] both show conditions for determining a material for the first lens element. A deviation from the expression [13] results in an increase in astigmatic difference, and an insufficient compensation for coma. A deviation from the expression [14] results in an insufficient compensation for chromatic aberration.

In each of the lens systems according to the eighth to eleventh embodiments, two of the three lens elements are formed of plastic. Specifically, the second lens element is formed of polycarbonate, and the third lens element of acrylic resin. This construction allows the lens system to be lightweight and enables mass production through a shaping process. Although asymmetric, these lens systems reliably compensate for various aberrations including distortion.

Tables 10 to 13 show numeric values for radii of curvature, axial distances, refractive indices at line d and Abbe numbers of the eighth to eleventh embodiments. FIGS. 16, 18, 20 and 22 show aberration curves in the eighth to eleventh embodiments at −1x. Each lens system has a focal length f=180 mm, F-number 10 and a half angle of view ω=22.6°.

Table 14 shows numeric values for the foregoing conditional expressions for the eighth to eleventh embodiments, and numeric values for the total thickness Σd indicative of compactness.

A twelfth to a sixteenth embodiments will be described next. These embodiments include a second and a third lens elements formed of plastic and each defining at least one aspheric surface.

TABLE 10

| f = 180 FNo. = 10.0 RADIUS OF CURV. | | AXIAL DISTANCE | | REFRACT.IND.(Nd) | | ABBE No.(νd) | |
|---|---|---|---|---|---|---|---|
| $r_1$ | 36.68 | | | | | | |
| | | $d_1$ | 7.70 | $N_1$ | 1.7859 | $\nu_1$ | 43.9 |
| $r_2$ | 168.75 | | | | | | |
| | | $d_2$ | 3.80 | | | | |
| $r_3$ | −629.34 | | | | | | |
| | | $d_3$ | 2.00 | $N_2$ | 1.5840 | $\nu_2$ | 31.0 |
| $r_4$ | 30.36 | | | | | | |
| | | $d_4$ | 18.16 | | | | |
| $r_5$ | 194.91 | | | | | | |
| | | $d_5$ | 5.00 | $N_3$ | 1.4914 | $\nu_3$ | 57.8 |
| $r_6$ | −136.29 | | | | | | |
| | | Σd = 36.66 | | | | | |

TABLE 11

| f = 180 FNo. = 10.0 RADIUS OF CURV. | | AXIAL DISTANCE | | REFRACT.IND.(Nd) | | ABBE No.(νd) | |
|---|---|---|---|---|---|---|---|
| $r_1$ | 34.48 | | | | | | |
| | | $d_1$ | 8.00 | $N_1$ | 1.7200 | $\nu_1$ | 42.0 |
| $r_2$ | 237.28 | | | | | | |
| | | $d_2$ | 4.00 | | | | |
| $r_3$ | −309.32 | | | | | | |
| | | $d_3$ | 2.00 | $N_2$ | 1.5840 | $\nu_2$ | 31.0 |
| $r_4$ | 28.96 | | | | | | |
| | | $d_4$ | 17.08 | | | | |
| $r_5$ | 174.74 | | | | | | |
| | | $d_5$ | 5.50 | $N_3$ | 1.4914 | $\nu_3$ | 57.8 |
| $r_6$ | −129.06 | | | | | | |
| | | Σd = 36.58 | | | | | |

TABLE 12

| f = 180 FNo. = 10.0 RADIUS OF CURV. | | AXIAL DISTANCE | | REFRACT.IND.(Nd) | | ABBE No.(νd) | |
|---|---|---|---|---|---|---|---|
| $r_1$ | 37.28 | | | | | | |
| | | $d_1$ | 7.70 | $N_1$ | 1.7856 | $\nu_1$ | 42.8 |
| $r_2$ | 173.81 | | | | | | |
| | | $d_2$ | 4.00 | | | | |
| $r_3$ | −586.23 | | | | | | |
| | | $d_3$ | 2.40 | $N_2$ | 1.5840 | $\nu_2$ | 31.0 |
| $r_4$ | 30.73 | | | | | | |
| | | $d_4$ | 18.11 | | | | |
| $r_5$ | 188.68 | | | | | | |
| | | $d_5$ | 5.30 | $N_3$ | 1.4914 | $\nu_3$ | 57.8 |
| $r_6$ | −137.51 | | | | | | |
| | | Σd = 37.51 | | | | | |

TABLE 13

| f = 180 FNo. = 10.0 RADIUS OF CURV. | | AXIAL DISTANCE | | REFRACT.IND.(Nd) | | ABBE No.(νd) | |
|---|---|---|---|---|---|---|---|
| $r_1$ | 38.19 | | | | | | |
| | | $d_1$ | 7.70 | $N_1$ | 1.8205 | $\nu_1$ | 43.0 |

TABLE 13-continued

| f = 180 FNo. = 10.0 RADIUS OF CURV. | AXIAL DISTANCE | | REFRACT.IND.(Nd) | | ABBE No.(νd) | |
|---|---|---|---|---|---|---|
| r₂ 152.57 | | | | | | |
| | d₂ | 3.80 | | | | |
| r₃ −909.80 | | | | | | |
| | d₃ | 2.00 | N₂ | 1.5840 | ν₂ | 31.0 |
| r₄ 31.56 | | | | | | |
| | d₄ | 18.44 | | | | |
| r₅ 198.10 | | | | | | |
| | d₅ | 5.00 | N₃ | 1.4914 | ν₃ | 47.8 |
| r₆ −142.54 | | | | | | |
| | Σd = 36.94 | | | | | |

FIGS. 23, 25, 27, 29 and 31 are sectional views showing lens systems in these embodiments. Each of the lens systems includes, from the left side, a first, positive meniscus lens element having a convex surface directed outwardly of the system, a second, concave lens element, and a third, convex lens element. The second and third lens elements are formed of plastic. Specifically, the second lens element is formed of polycarbonate, and the third lens element of acrylic resin. This construction allows the lens system to be lightweight and enables mass production through a shaping process.

These lens systems satisfy the following conditional expressions:

$$0.005f < d_2 < 0.015f \quad [15]$$

$$0.05f < d_4 < 0.15f \quad [16]$$

$$0.015f < f_1 + f_2 < 0.05f \quad [17]$$

$$1.65 < N_1 \quad [18]$$

$$35 < \nu_1 < 50 \quad [19]$$

where f is a focal length of each entire system, $d_2$ is an axial distance between the first and second lens elements, $d_4$ is an axial distance between the second and third lens elements, $f_1$ is a focal length of the first lens element, $f_2$ is a focal length of the second lens element, $N_1$ is a refractive index at line d of the first lens element, and $\nu_1$ is Abbe number of the first lens element.

TABLE 14

| | [10] 0.015f < d₂ < 0.025f | [11] 0.05f < d₄ < 0.15f |
|---|---|---|
| EMBODIMENT 8 | 0.0211f | 0.1009f |
| EMBODIMENT 9 | 0.0222f | 0.0949f |
| EMBODIMENT 10 | 0.0222f | 0.1006f |
| EMBODIMENT 11 | 0.0211f | 0.1024f |

| | [12] 0.04f < f₁ + f₂ < 0.06f | [13] 1.65 < N₁ |
|---|---|---|
| EMBODIMENT 8 | 0.0478f | 1.7859 |
| EMBODIMENT 9 | 0.0548f | 1.7200 |
| EMBODIMENT 10 | 0.0501f | 1.7856 |
| EMBODIMENT 11 | 0.0449f | 1.8025 |

| | [14] 35 < ν₁ < 50 | Σd |
|---|---|---|
| EMBODIMENT 8 | 43.9 | 0.204f |
| EMBODIMENT 9 | 42.0 | 0.203f |

TABLE 14-continued

| EMBODIMENT 10 | 42.8 | 0.208f |
|---|---|---|
| EMBODIMENT 11 | 43.0 | 0.205f |

The conditional expression [15] is one for determining the axial distance between the first and second lens elements. In the event of a deviation from this condition, it is difficult to compensate for distortion, magnification and chromatic aberration in a balanced manner.

The conditional expression [16] is one for determining the axial distance between the second and third lens elements. Coma flare becomes excessive in the event of a deviation from the lower limit, thereby reducing the contrast of an image. Above its upper limit, compensation for distortion becomes insufficient. This produces the undesirable result of enlarging the lens.

The conditional expression [17] is one for determining the sum of focal lens of the first and second lens elements and for suppressing mainly spherical aberration. Compensation for spherical aberration will be excessive in the event of a deviation from the upper limit of the conditional expression [17]. Below its lower limit, compensation for spherical aberration becomes insufficient and astigmatism becomes excessive, thereby causing a tilt of the image plane.

The conditional expressions [18] and [19] both show conditions for determining a material for the first lens element. A deviation from the expression [18] results in an increase in astigmatic difference, and an insufficient compensation for coma. A deviation from the expression [19] results in an insufficient compensation for chromatic aberration.

Tables 15 to 19 show numeric values for radii of curvature, axial distances, refractive indices at line d and Abbe numbers of the twelfth to sixteenth embodiments. FIGS. 24, 26, 28, 30 and 32 show aberration curves in the twelfth to sixteenth embodiments at −1x. Each lens system has a focal length f=180 mm, F-number 10 and a half angle of view ω=22.6°. Table 20 shows numeric values for the foregoing conditional expressions [15] through [19] for the twelfth to sixteenth embodiments, and numeric values for the total thickness Σd indicative of compactness.

The twelfth to sixteenth embodiments have the second and third lens elements defining aspheric surfaces. In the twelfth to fourteenth embodiments, the second lens element defines an aspheric surface opposed to the third lens element. In the fifteenth embodiment, the second lens element defines an aspheric surface opposed to the first lens element. In the sixteen embodiment, the second lens element defines an aspheric surface opposed to the third lens element, and the third lens element defines an aspheric surface directed outwardly of the lens system. Coefficients of the aspheric surfaces are shown in the bottoms of Tables 15 to 19.

FIGS. 33, 35, 37 and 39 are sectional views showing lens systems in these embodiments. Each of the lens systems includes, from the left side opposed to an ob-

TABLE 15

| f = 180 | | FNo. = 10.0 | |
|---|---|---|---|
| RADIUS OF CURV. | AXIAL DISTANCE | REFRACT. IND (Nd) | ABBE No. ($\nu$d) |
| $r_1$ 34.28 | | | |
| | $d_1$ 7.70 | $N_1$ 1.7856 | $\nu_1$ 42.8 |
| $r_2$ 158.64 | | | |
| | $d_2$ 2.00 | | |
| $r_3$ −1574.11 | | | |
| | $d_3$ 2.40 | $N_2$ 1.5840 | $\nu_2$ 31.0 |
| $r_4^*$ 28.51 | | | |
| | $d_4$ 18.37 | | |
| $r_5$ 189.75 | | | |
| | $d_5$ 5.30 | $N_3$ 1.4914 | $\nu_3$ 57.8 |
| $r_6$ −162.41 | | | |
| | $\Sigma d$ = 35.77 | | |

ASPHERICAL SURFACE COEFFECIENT $r_4$: $A_2 = 0.0$, $A_3 = 0.0$, $A_4 = 0.24564 \times 10^{-7}$
$A_5 = 0.0$, $A_6 = 0.20753 \times 10^{-9}$, $A_7 = 0.0$
$A_8 = 0.17162 \times 10^{-15}$, $A_9 = 0.0$, $A_{10} = -0.16968 \times 10^{-16}$
$A_{11} = 0.0$, $A_{12} = -0.34161 \times 10^{-18}$, $A_{13} = 0.0$
$A_{14} = -0.13799 \times 10^{-17}$, $A_{15} = 0.0$, $A_{16} = 0.0$

TABLE 16

| f = 180 | | FNo. = 10.0 | |
|---|---|---|---|
| RADIUS OF CURV. | AXIAL DISTANCE | REFRACT. IND (Nd) | ABBE No. ($\nu$d) |
| $r_1$ 35.27 | | | |
| | $d_1$ 7.70 | $N_1$ 1.7995 | $\nu_1$ 42.3 |
| $r_2$ 155.01 | | | |
| | $d_2$ 1.50 | | |
| $r_3$ −7768.19 | | | |
| | $d_3$ 3.70 | $N_2$ 1.5840 | $\nu_2$ 31.0 |
| $r_4^*$ 29.05 | | | |
| | $d_4$ 18.36 | | |
| $r_5$ 182.24 | | | |
| | $d_5$ 5.30 | $N_3$ 1.4914 | $\nu_3$ 57.8 |
| $r_6$ −179.80 | | | |
| | $\Sigma d$ = 36.56 | | |

ASPHERICAL SURFACE COEFFECIENT $r_4$: $A_2 = 0.0$, $A_3 = 0.0$, $A_4 = 0.59240 \times 10^{-7}$.
$A_5 = 0.0$, $A_6 = 0.51484 \times 10^{-9}$, $A_7 = 0.0$
$A_8 = 0.75687 \times 10^{-15}$, $A_9 = 0.0$, $A_{10} = -0.10666 \times 10^{-15}$
$A_{11} = 0.0$, $A_{12} = -0.31771 \times 10^{-18}$, $A_{13} = 0.0$
$A_{14} = -0.13002 \times 10^{-17}$, $A_{15} = 0.0$, $A_{16} = 0.0$ The description made of the aspheric surface in the first to third embodiments applies to the twelfth to sixteenth embodiments also.

A seventeenth to a twentieth embodiments will be described next. These embodiments also include a second and a third lens elements formed of plastic and defining aspheric surfaces.

ject, a first, positive meniscus lens element having a convex surface directed toward the object, a second, concave lens element, and a third, convex lens element. The second and third lens elements are formed of plastic. Specifically, the second lens element is formed of polycarbonate, and the third lens element of acrylic resin. This construction allows the lens system to be lightweight and enables mass production through a shaping process.

TABLE 17

| f = 180 | | FNo. = 10.0 | |
|---|---|---|---|
| RADIUS OF CURV. | AXIAL DISTANCE | REFRACT. IND (Nd) | ABBE No. ($\nu$d) |
| $r_1$ 30.21 | | | |
| | $d_1$ 5.00 | $N_1$ 1.7620 | $\nu_1$ 40.4 |
| $r_2$ 110.81 | | | |
| | $d_2$ 1.80 | | |
| $r_3$ 926.84 | | | |
| | $d_3$ 3.70 | $N_2$ 1.5840 | $\nu_2$ 31.0 |
| $r_4^*$ 25.95 | | | |
| | $d_4$ 13.37 | | |
| $r_5$ 110.96 | | | |
| | $d_5$ 5.30 | $N_3$ 1.4914 | $\nu_3$ 57.8 |
| $r_6$ −269.12 | | | |
| | $\Sigma d$ = 19.17 | | |

TABLE 17-continued

| f = 180 | FNo. = 10.0 | |
|---|---|---|
| ASPHERICAL SURFACE COEFFICIENT | | |
| $r_4$: $A_2 = 0.0$, | $A_3 = 0.0$, | $A_4 = 0.90539 \times 10^{-7}$ |
| $A_5 = 0.0$, | $A_6 = 0.89903 \times 10^{-9}$, | $A_7 = 0.0$ |
| $A_8 = 0.12844 \times 10^{-14}$, | $A_9 = 0.0$, | $A_{10} = -0.11284 \times 10^{-15}$ |
| $A_{11} = 0.0$, | $A_{12} = -0.33922 \times 10^{-18}$, | $A_{13} = 0.0$ |
| $A_{14} = -0.10720 \times 10^{-16}$, | $A_{15} = 0.0$, | $A_{16} = 0.0$ |

These lens systems satisfy the following conditional expressions:

$$0.05f < d_2 < 0.025f \quad [20]$$

$$0.05f < d_4 < 0.08f \quad [21]$$

$$1.75 < N_1 < 1.85 \quad [22]$$

$$35 < \nu_1 < 50 \quad [23]$$

$$-0.1 < \frac{r_4}{r_5} < 0.25 \quad [24]$$

where f is a focal length of each entire system, $d_2$ is an axial distance between the first and second lens elements, $d_4$ is an axial distance between the second and third lens elements, $f_1$ is a focal length of the first lens element, $f_2$ is a focal length of the second lens element, $N_1$ is a refractive index at line d of the first lens element, $\nu_1$ is Abbe number of the first lens element, $r_4$ is a radius of curvature of the surface of the second lens element opposed to the third lens element, and $r_5$ is a radius of curvature of the surface of the third lens element opposed to the second lens element.

TABLE 18

| f = 180 | | FNo. = 10.0 | | |
|---|---|---|---|---|
| RADIUS OF CURV. | | AXIAL DISTANCE | REFRACT. IND (Nd) | ABBE No. (νd) |
| $r_1$ | 34.64 | | | |
| | | $d_1$ 7.70 | $N_1$ 1.7995 | $\nu_1$ 42.3 |
| $r_2$ | 137.06 | | | |
| | | $d_2$ 1.50 | | |
| $r_3$* | 1639.40 | | | |
| | | $d_3$ 3.70 | $N_2$ 1.5840 | $\nu_2$ 31.0 |
| $r_4$* | 28.56 | | | |
| | | $d_4$ 17.74 | | |
| $r_5$ | 159.98 | | | |
| | | $d_5$ 5.30 | $N_3$ 1.4914 | $\nu_3$ 57.8 |
| $r_6$ | −202.29 | | | |
| | | Σd = 34.89 | | |

| ASPHERICAL SURFACE COEFFICIENT | | |
|---|---|---|
| $r_3$: $A_2 = 0.0$, | $A_3 = 0.0$, | $A_4 = -0.15797 \times 10^{-6}$ |
| $A_5 = 0.0$, | $A_6 = 0.20725 \times 10^{-8}$, | $A_7 = 0.0$ |
| $A_8 = -0.35825 \times 10^{-10}$, | $A_9 = 0.0$, | $A_{10} = 0.15895 \times 10^{-12}$ |
| $A_{11} = 0.0$, | $A_{12} = 0.24109 \times 10^{-15}$, | $A_{13} = 0.0$ |
| $A_{14} = -0.13211 \times 10^{-17}$, | $A_{15} = 0.0$, | $A_{16} = 0.0$ |
| $r_4$: $A_2 = 0.0$, | $A_3 = 0.0$, | $A_4 = 0.14540 \times 10^{-8}$ |
| $A_5 = 0.0$, | $A_6 = 0.22058 \times 10^{-10}$, | $A_7 = 0.0$ |
| $A_8 = 0.70808 \times 10^{-15}$, | $A_9 = 0.0$, | $A_{10} = -0.14977 \times 10^{-16}$ |
| $A_{11} = 0.0$, | $A_{12} = -0.31317 \times 10^{-18}$, | $A_{13} = 0.0$ |
| $A_{14} = 0.77389 \times 10^{-17}$, | $A_{15} = 0.0$, | $A_{16} = 0.0$ |

TABLE 19

| f = 180 | | FNo. = 10.0 | | |
|---|---|---|---|---|
| RADIUS OF CURV. | | AXIAL DISTANCE | REFRACT. IND (Nd) | ABBE No. (νd) |
| $r_1$ | 30.80 | | | |
| | | $d_1$ 6.30 | $N_1$ 1.7856 | $\nu_1$ 42.8 |
| $r_2$ | 100.71 | | | |
| | | $d_2$ 2.00 | | |
| $r_3$ | 314.41 | | | |
| | | $d_3$ 2.50 | $N_2$ 1.5840 | $\nu_2$ 31.0 |
| $r_4$* | 26.62 | | | |
| | | $d_4$ 19.38 | | |
| $r_5$ | 91.39 | | | |
| | | $d_5$ 4.81 | $N_3$ 1.4914 | $\nu_3$ 57.8 |
| $r_6$* | 1041.84 | | | |
| | | Σd = 34.89 | | |

| ASPHERICAL SURFACE COEFFICIENT | | |
|---|---|---|
| $r_4$: $A_2 = 0.0$, | $A_3 = 0.0$, | $A_4 = 0.47833 \times 10^{-7}$ |
| $A_5 = 0.0$, | $A_6 = 0.42846 \times 10^{-8}$, | $A_7 = 0.0$ |
| $A_8 = 0.10513 \times 10^{-15}$, | $A_9 = 0.0$, | $A_{10} = 0.53716 \times 10^{-17}$ |
| $A_{11} = 0.0$, | $A_{12} = -0.24619 \times 10^{-14}$, | $A_{13} = 0.0$ |

TABLE 19-continued

| f = 180 | | FNo. = 10.0 | |
|---|---|---|---|
| | $A_{14} = 0.12123 \times 10^{-16}$, | $A_{15} = 0.0$, | $A_{16} = -0.11447 \times 10^{19}$ |
| $r_6$: | $A_2 = 0.0$, | $A_3 = 0.0$, | $A_4 = 0.62893 \times 10^{-6}$ |
| | $A_5 = 0.0$, | $A_6 = 0.80976 \times 10^{-8}$, | $A_7 = 0.0$ |
| | $A_8 = -0.83956 \times 10^{-10}$, | $A_9 = 0.0$, | $A_{10} = 0.19293 \times 10^{-12}$ |
| | $A_{11} = 0.0$, | $A_{12} = 0.13714 \times 10^{-18}$, | $A_{13} = 0.0$ |
| | $A_{14} = 0.24500 \times 10^{-17}$, | $A_{15} = 0.0$, | $A_{16} = 0.0$ |

TABLE 20

| | [15] $0.005f < d_2 < 0.015f$ | [16] $0.05f < d_4 < 0.15f$ |
|---|---|---|
| EMBODIMENT 12 | 0.0111f | 0.1021f |
| EMBODIMENT 13 | 0.0083f | 0.1020f |
| EMBODIMENT 14 | 0.0100f | 0.0743f |
| EMBODIMENT 15 | 0.0083f | 0.0986f |
| EMBODIMENT 16 | 0.0111f | 0.1077f |

| | [17] $0.015f < f_1 + f_2 < 0.05f$ | [18] $1.65f < N_1$ |
|---|---|---|
| EMBODIMENT 12 | 0.0348f | 1.7856 |
| EMBODIMENT 13 | 0.0332f | 1.7995 |
| EMBODIMENT 14 | 0.0405f | 1.7620 |
| EMBODIMENT 15 | 0.0350f | 1.7995 |
| EMBODIMENT 16 | 0.0243f | 1.7856 |

| | [19] $35 < \nu_1 < 50$ | $\Sigma d$ |
|---|---|---|
| EMBODIMENT 12 | 42.8 | 0.199f |
| EMBODIMENT 13 | 42.3 | 0.203f |
| EMBODIMENT 14 | 40.4 | 0.162f |
| EMBODIMENT 15 | 42.3 | 0.200f |
| EMBODIMENT 16 | 42.8 | 0.194f |

The conditional expression [20] is one for determining the axial distance between the first and second lens elements. In the event of a deviation from this condition, it is difficult to compensate for distortion, magnification and chromatic aberration in a balanced manner.

The conditional expression [21] is one for determining the axial distance between the second and third lens elements. Coma flare becomes excessive in the event of a deviation from the lower limit, thereby reducing the contrast of an image. Above its upper limit, compensation for distortion becomes insufficient. This produces the undesirable result of enlarging the lens.

The conditional expressions [22] and [23] both show conditions for determining a material for the first lens element. A deviation from the expression [22] results in an increase in astigmatic difference, and an insufficient compensation for coma. A deviation from the expression [23] results in an insufficient compensation for chromatic aberration.

The conditional expression [24] shows a ratio in radius of curvature between the second and third lens elements for compensating for coma and spherical aberration. In the event of a deviation from its upper limit, coma becomes excessive, and compensation for spherical aberration becomes insufficient, thereby reducing contrast of the image. Below its lower limited, compensation for spherical aberration becomes excessive.

In addition, image plane characteristics become poor with a deterioration in performance occurring in peripheral regions.

Further, the seventeenth to twentieth embodiments satisfy the following conditional expression:

$$0.03f < f_1 + f_2 < 0.1f$$

where $f_1$ is a focal length of the first lens element, and $f_2$ is a focal length of the second lens element.

This expression is one for determining the sum of focal lengths of the first and second lens elements and for suppressing mainly spherical aberration. Compensation for spherical aberration will be excessive in the event of a deviation from its upper limit. Below its lower limit, compensation for spherical aberration becomes insufficient and astigmatism becomes excessive, thereby causing a tilt of the image plane.

Tables 21 to 24 show numeric values for radii of curvature, axial distances, refractive indices at line d and Abbe numbers of the seventeenth to twentieth embodiments. FIGS. 34, 36, 38 and 40 show aberration curves in the seventeenth to twentieth embodiments at −1x.

Each lens system has a focal length f=180 mm, F-number 10 and a half angle of view ω=22.6°. Table 25 shows numeric values for the foregoing conditional expressions [20] through [24] for the seventeenth to twentieth embodiments, and numeric values for the total thickness Σd indicative of compactness.

TABLE 21

| f = 180 | | FNo. = 10.0 | | |
|---|---|---|---|---|
| RADIUS OF CURV. | | AXIAL DISTANCE | REFRACT. IND (Nd) | ABBE No. (νd) |
| $r_1$ | 30.52 | | | |
| | | $d_1$ 6.30 | $N_1$ 1.7620 | $\nu_1$ 40.4 |
| $r_2$ | 101.79 | | | |
| | | $d_2$ 2.00 | | |
| $r_3$ | 401.88 | | | |
| | | $d_3$ 2.50 | $N_2$ 1.5840 | $\nu_2$ 31.0 |
| $r_4$* | 24.85 | | | |
| | | $d_4$ 12.13 | | |
| $r_5$ | 3839.51 | | | |

TABLE 21-continued

| f = 180 | | FNo. = 10.0 | | |
|---|---|---|---|---|
| | | $d_5$ 4.81 | $N_3$ 1.4914 | $\nu_3$ 57.8 |
| $r_6$* | −71.24 | | | |
| | | $\Sigma d$ = 27.74 | | |

| ASPHERICAL SURFACE COEFFICIENT |
|---|

$r_4$: $A_2 = 0.0$, $A_3 = 0.0$, $A_4 = 0.23755 \times 10^{-5}$
$A_5 = 0.0$, $A_6 = 0.45129 \times 10^{-8}$, $A_7 = 0.0$
$A_8 = 0.10520 \times 10^{-15}$, $A_9 = 0.0$, $A_{10} = 0.53787 \times 10^{-17}$
$A_{11} = 0.0$, $A_{12} = -0.42574 \times 10^{-14}$, $A_{13} = 0.0$
$A_{14} = 0.82913 \times 10^{-16}$, $A_{15} = 0.0$, $A_{16} = 0.40424 \times 10^{-18}$
$r_6$: $A_2 = 0.0$, $A_3 = 0.0$, $A_4 = -0.46571 \times 10^{-5}$
$A_5 = 0.0$, $A_6 = 0.79477 \times 10^{-7}$, $A_7 = 0.0$
$A_8 = -0.12881 \times 10^{-8}$, $A_9 = 0.0$, $A_{10} = 0.74208 \times 10^{-11}$
$A_{11} = 0.0$, $A_{12} = 0.13712 \times 10^{-18}$, $A_{13} = 0.0$
$A_{14} = -0.93002 \times 10^{-16}$, $A_{15} = 0.0$, $A_{16} = 0.0$ In the seventeenth to twentieth embodiments, the second lens element defines an aspheric surface $r_4$ opposed to the third lens element, and the third lens element defines an aspheric surface $r_6$ directed outwardly of the lens system. Coefficients of the aspheric surfaces are shown in the bottoms of Tables 21 to 24. The description of the aspheric surfaces has already been made and will not be repeated.

TABLE 22

| f = 180 | | FNo. = 10.0 | | |
|---|---|---|---|---|
| RADIUS OF CURV. | | AXIAL DISTANCE | REFRACT. IND (Nd) | ABBE No. ($\nu d$) |
| $r_1$ | 31.43 | | | |
| | | $d_1$ 6.30 | $N_1$ 1.7620 | $\nu_1$ 40.4 |
| $r_2$ | 112.27 | | | |
| | | $d_2$ 2.00 | | |
| $r_3$ | 425.45 | | | |
| | | $d_3$ 3.00 | $N_2$ 1.5840 | $\nu_2$ 31.0 |
| $r_4$* | 24.85 | | | |
| | | $d_4$ 12.13 | | |
| $r_5$ | −479.33 | | | |
| | | $d_5$ 4.81 | $N_3$ 1.4914 | $\nu_3$ 57.8 |
| $r_6$* | −60.30 | | | |
| | | $\Sigma d$ = 28.24 | | |

| ASPHERICAL SURFACE COEFFICIENT |
|---|

$r_4$: $A_2 = 0.0$, $A_3 = 0.0$, $A_4 = 0.29439 \times 10^{-5}$
$A_5 = 0.0$, $A_6 = 0.46134 \times 10^{-8}$, $A_7 = 0.0$
$A_8 = 0.10524 \times 10^{-15}$, $A_9 = 0.0$, $A_{10} = 0.52927 \times 10^{-17}$
$A_{11} = 0.0$, $A_{12} = 0.19481 \times 10^{-13}$, $A_{13} = 0.0$
$A_{14} = -0.27094 \times 10^{-15}$, $A_{15} = 0.0$, $A_{16} = 0.10486 \times 10^{-17}$
$r_6$: $A_2 = 0.0$, $A_3 = 0.0$, $A_4 = -0.49450 \times 10^{-5}$
$A_5 = 0.0$, $A_6 = 0.65343 \times 10^{-7}$, $A_7 = 0.0$
$A_8 = -0.10859 \times 10^{-8}$, $A_9 = 0.0$, $A_{10} = 0.61344 \times 10^{-11}$
$A_{11} = 0.0$, $A_{12} = 0.13710 \times 10^{-18}$, $A_{13} = 0.0$
$A_{14} = -0.73164 \times 10^{-16}$, $A_{15} = 0.0$, $A_{16} = 0.0$

TABLE 23

| f = 180 | | FNo. = 10.0 | | |
|---|---|---|---|---|
| RADIUS OF CURV. | | AXIAL DISTANCE | REFRACT. IND (Nd) | ABBE No. ($\nu d$) |
| $r_1$ | 37.56 | | | |
| | | $d_1$ 7.70 | $N_1$ 1.8050 | $\nu_1$ 41.0 |
| $r_2$ | 127.84 | | | |
| | | $d_2$ 3.95 | | |
| $r_3$ | −545.95 | | | |
| | | $d_3$ 2.40 | $N_2$ 1.5840 | $\nu_2$ 31.0 |
| $r_4$* | 30.72 | | | |
| | | $d_4$ 13.27 | | |
| $r_5$ | 216.19 | | | |
| | | $d_5$ 5.01 | $N_3$ 1.4914 | $\nu_3$ 57.8 |
| $r_6$* | −90.58 | | | |
| | | $\Sigma d$ = 32.33 | | |

| ASPHERICAL SURFACE COEFFICIENT |
|---|

$r_4$: $A_2 = 0.0$, $A_3 = 0.0$, $A_4 = 0.31405 \times 10^{-8}$
$A_5 = 0.0$, $A_6 = 0.13301 \times 10^{-11}$, $A_7 = 0.0$
$A_8 = 0.30421 \times 10^{-13}$, $A_9 = 0.0$, $A_{10} = 0.85031 \times 10^{-12}$
$A_{11} = 0.0$, $A_{12} = -0.57602 \times 10^{-14}$, $A_{13} = 0.0$
$A_{14} = -0.0$, $A_{15} = 0.0$, $A_{16} = 0.0$
$r_6$: $A_2 = 0.0$, $A_3 = 0.0$, $A_4 = 0.87334 \times 10^{-6}$
$A_5 = 0.0$, $A_6 = 0.60545 \times 10^{-8}$, $A_7 = 0.0$
$A_8 = -0.53445 \times 10^{-10}$, $A_9 = 0.0$, $A_{10} = 0.93621 \times 10^{-15}$
$A_{11} = 0.0$, $A_{12} = 0.29506 \times 10^{-16}$, $A_{13} = 0.0$ TABLE 23-continued

| f = 180 | FNo. = 10.0 | |
|---|---|---|
| $A_{14} = -0.73084 \times 10^{-18}$, | $A_{15} = 0.0$, | $A_{16} = 0.0$ |

As described above, a lens system for use in a copying machine includes only three lens elements, one of which is formed of plastic to realize substantial reductions in cost as well as in weight. In conventional four component lens systems, the total lens thickness has a minimum value of 0.2f.

This invention provides a lens system with a greatly reduced thickness of 0.1f to 0.21f, thereby allowing the entire copying machine to be compact. The lens system of this invention is comparable to or exceeds conventional lens systems in performance.

this invention, the element opposed to the object plane and that opposed to the image plane may be reversed.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

TABLE 24

| f = 180 | FNo. = 10.0 | | |
|---|---|---|---|
| RADIUS OF CURV. | AXIAL DISTANCE | REFRACT. IND (Nd) | ABBE No. (νd) |
| $r_1$ 36.05 | | | |
| | $d_1$ 7.70 | $N_1$ 1.7856 | $\nu_1$ 42.8 |
| $r_2$ 119.23 | | | |
| | $d_2$ 3.97 | | |
| $r_3$ −878.47 | | | |
| | $d_3$ 2.40 | $N_2$ 1.5840 | $\nu_2$ 31.0 |
| $r_4$* 30.32 | | | |
| | $d_4$ 13.19 | | |
| $r_5$ 143.29 | | | |
| | $d_5$ 5.39 | $N_3$ 1.4914 | $\nu_3$ 57.8 |
| $r_6$* −123.71 | | | |
| | Σd = 32.65 | | |

| ASPHERICAL SURFACE COEFFICIENT | | |
|---|---|---|
| $r_4$: $A_2 = 0.0$, | $A_3 = 0.0$, | $A_4 = 0.20928 \times 10^{-8}$ |
| $A_5 = 0.0$, | $A_6 = 0.13288 \times 10^{-11}$, | $A_7 = 0.0$ |
| $A_8 = 0.16613 \times 10^{-13}$, | $A_9 = 0.0$, | $A_{10} = 0.11863 \times 10^{-13}$ |
| $A_{11} = 0.0$, | $A_{12} = -0.46941 \times 10^{-15}$, | $A_{13} = 0.0$ |
| $A_{14} = -0.0$ | $A_{15} = 0.0$, | $A_{16} = 0.0$ |
| $r_6$: $A_2 = 0.0$, | $A_3 = 0.0$, | $A_4 = 0.88431 \times 10^{-6}$ |
| $A_5 = 0.0$, | $A_6 = 0.14548 \times 10^{-7}$, | $A_7 = 0.0$ |
| $A_8 = -0.84638 \times 10^{-10}$, | $A_9 = 0.0$, | $A_{10} = 0.36374 \times 10^{-15}$ |
| $A_{11} = 0.0$, | $A_{12} = 0.11274 \times 10^{-16}$, | $A_{13} = 0.0$ |
| $A_{14} = 0.34066 \times 10^{-18}$, | $A_{15} = 0.0$, | $A_{16} = 0.0$ |

TABLE 25

| | [20] $0.005f < d_2 < 0.025f$ | [21] $0.05f < d_4 < 0.08f$ |
|---|---|---|
| EMBODIMENT 17 | 0.0111f | 0.0674f |
| EMBODIMENT 18 | 0.0111f | 0.0674f |
| EMBODIMENT 19 | 0.0219f | 0.0737f |
| EMBODIMENT 20 | 0.0221f | 0.0733f |

| | [22] $1.75 < N_1 < 1.85$ | [23] $35 < \nu_1 < 50$ | [24] $-0.1 < r_4/r_5 < 0.25$ |
|---|---|---|---|
| EMBODIMENT 17 | 1.7620 | 40.4 | 0.0065 |
| EMBODIMENT 18 | 1.7520 | 40.4 | −0.0518 |
| EMBODIMENT 19 | 1.8050 | 41.0 | 0.1421 |
| EMBODIMENT 20 | 1.7856 | 42.8 | 0.2116 |

| | $0.03f < f_1 + f_2 < 0.01f$ | Σd |
|---|---|---|
| EMBODIMENT 17 | 0.0530f | 0.154f |
| EMBODIMENT 18 | 0.0562f | 0.157f |
| EMBODIMENT 19 | 0.0773f | 0.180f |
| EMBODIMENT 20 | 0.0726f | 0.181f |

The foregoing embodiments have been described in relation to aberrations occurring at −1x, i.e. real-size copying. In real-size copying, an aberration occurs in exactly the same amount, disregarding the sign of distortion, when an object plane and an image plane are interchanged. Thus, in the lens systems according to 1. A three group, three component lens system comprising, in order from one side:

a first, positive meniscus lens defining a convex surface directed to an object plane;

a second, biconcave lens, and a third, biconvex lens, at least one of the three lenses being formed of plastic, the lens system included within a photocopier system having a fixed distance between the object plane and an image plane and requiring a clarity of image to correspond across an image having a fixed size in both the object and image planes, the lens system satisfying the following expressions:

$$0.1f < f_1 + f_2 < 0.2f \tag{a}$$

where f is a focal length of the lens system, $f_1$ is a focal length of said first lens, and $f_2$ is a focal length of said second lens:

$$0.03f < d_4 < 0.05f \tag{b}$$

where $d_4$ is an axial distance between said second and third lenses;

$$40 < 0.5 \, (\nu_1 + \nu_3) < 50 \tag{c}$$

where $\nu_1$ is Abbe number of a material forming said first lens, and $\nu_3$ is Abbe number of a material forming said third lens;

$$1.65 < 0.5\,(N_1 + N_3) < 1.75 \tag{d}$$

where $N_1$ is a refractive index at line d of a material forming said first lens, and $N_3$ is a refractive index at line d of a material forming said third lens; and $$0.18 < r_4/r_5 < 0.23 \tag{e}$$

where $r_4$ is a radius of curvature of a surface of said second lens opposed to said third lens, and $r_5$ is a radius of curvature of a surface of said third lens opposed to said second lens.

2. A lens system as claimed in claim 1, wherein said second lens has an aspherical surface.

3. A three group, three component lens system comprising, in order from one side:
 a first, positive meniscus lens defining a convex surface directed to an object plane;
 a second, biconcave lens, and
 a third, biconvex lens,
 at least one of the three lenses being formed of plastic, the lens system included within a photocopier system having a fixed distance between the object plane and an image plane and requiring a clarity of image to correspond across an image having a fixed size in both the object and image planes, the lens system satisfying the following expressions:

$$40 < 0.5\,(\nu_1 + \nu_3) < 50 \tag{a}$$

where $\nu_1$ is Abbe number of a material forming said first lens, and $\nu_3$ is Abbe number of a material forming said third lens;

$$0.04f < f_1 + f_2 < 0.20f \tag{b}$$

where f is a focal length of the entire lens system, $f_1$ is a focal length of said first lens, and $f_2$ is a focal length of said second lens;

$$0.05f < d_4 < 0.08f \tag{c}$$

where $d_4$ is an axial distance between said second and third lenses, and $$0.10 < r_4/r_5 < 0.25 \tag{d}$$

where $r_4$ is a radius of curvature of a surface of said second lens opposed to said third lens, and $r_5$ is a radius of curvature of a surface of said third lens opposed to said second lens.

4. A three group, three component lens system comprising, in order from one side:
 a first, positive meniscus lens defining a convex surface directed to an object plane;
 a second lens having a negative power, and
 a third lens having a positive power,
 said second and third lenses being formed of plastic, and the lens system included within a photocopier system having a fixed distance between the object plane and an image plane and requiring a clarity of image to correspond across an image having a fixed size in both the object and image planes, the lens system satisfying the following expressions:

$$0.04f < f_1 + f_2 < 0.06f \tag{a}$$

where f is a focal length of the lens system, $f_1$ is a focal length of said first lens, and $f_2$ is a focal length of said second lens;

$$0.015f < d_2 < 0.025f \tag{b}$$

where $d_2$ is an axial distance between said first and second lenses;

$$0.05f < d_4 < 0.15f \tag{c}$$

where $d_4$ ia an axial distance between said second and third lenses;

$$35 < \nu_1 < 50, \text{ and} \tag{d}$$

$$1.65 < N_1$$

where $\nu_1$ is Abbe number of a material forming said first lens, and $N_1$ is a refractive index at line d of the material forming said first lens.

5. A three group, three component lens system comprising, in order from one side:
 a first, positive meniscus lens defining a convex surface directed to an object plane;
 a second lens having a negative power, and
 a third lens having a positive power,
 said second and third lenses being formed of plastic, and the lens system included within a photocopier system having a fixed distance between the object plane and an image plane and requiring a clarity of image to correspond across an image having a fixed size in both the object and image planes, the lens system satisfying the following expressions:

$$0.015f < f_1 + f_2 < 0.05f \tag{a}$$

where f is a focal length of the lens system, $f_1$ is a focal length of said first lens, and $f_2$ is a focal length of said second lens;

$$0.005f < d_2 < 0.015f \tag{b}$$

where $d_2$ is an axial distance between said first and second lenses;

$$0.05f < d_4 < 0.15f \tag{c}$$

where $d_4$ is an axial distance between said second and third lenses;

$$35 < \nu_1 < 50, \text{ and} \tag{d}$$

$$1.65 < N_1$$

where $\nu_1$ is Abbe number of a material forming said first lens, and $N_1$ is a refractive index at line d of the material forming said first lens.

6. A lens system as claimed in claim 5, wherein said second and third lenses have at least one spherical surface.

7. A three group, three component lens system comprising, in order from one side:
 a first, positive meniscus lens defining a convex surface directed to an object plane;
 a second lens having a negative power, and
 a third lens having a positive power, said second and third lenses being formed of plastic, and the lens system included within a compact photocopier system having a fixed distance between the object plane and an image plane and requiring a clarity of image to correspond across an image having a fixed size in both the object and image planes, the lens system satisfying the following expressions:

$$0.005f < d_2 < 0.025f \quad (a)$$

where f is a focal length of the lens system, and $d_2$ is an axial distance between said first and second lenses;

$$0.05f < d_4 < 0.08f \quad (b)$$

where $d_4$ is an axial distance between said second and third lenses;

$$35 < \nu_1 < 50, \text{ and} \quad (c)$$

$$1.75 < N_1 < 1.85$$

where $\nu_1$ is Abbe number of a material forming said first lens, and $N_1$ is a refractive index at line d of the material forming said first lens;

$$-0.1 < r_4/r_5 < 0.25 \quad (d)$$

where $r_4$ is a radius of curvature of a surface of said second lens opposed to said third lens, and $r_5$ is a radius of curvature of a surface of said third lens opposed to said second lens.

8. A lens system as claimed in claim 7, wherein said second and third lenses have two aspherical surfaces.

* * * * *